US009781479B2

(12) United States Patent
Klappert et al.

(10) Patent No.: US 9,781,479 B2
(45) Date of Patent: Oct. 3, 2017

(54) METHODS AND SYSTEMS OF RECOMMENDING MEDIA ASSETS TO USERS BASED ON CONTENT OF OTHER MEDIA ASSETS

(71) Applicant: Rovi Guides, Inc., Santa Clara, CA (US)

(72) Inventors: Walter R. Klappert, Los Angeles, CA (US); Dustin Shaw, Murphy, TX (US); Michael R. Nichols, La Canada Flintridge, CA (US); Christy Garcia, Malibu, CA (US); Tricia Nelson, Burbank, CA (US); Derek Martin, Pacific Palisades, CA (US)

(73) Assignee: Rovi Guides, Inc., San Carlos, CA (US)

( * ) Notice: Subject to any disclaimer, the term of this patent is extended or adjusted under 35 U.S.C. 154(b) by 0 days.

(21) Appl. No.: 15/056,578

(22) Filed: Feb. 29, 2016

(65) Prior Publication Data
US 2017/0251259 A1 Aug. 31, 2017

(51) Int. Cl.
*H04N 5/445* (2011.01)
*G06F 3/00* (2006.01)
*G06F 13/00* (2006.01)
*H04N 21/466* (2011.01)
*H04N 21/482* (2011.01)

(52) U.S. Cl.
CPC ..... *H04N 21/4668* (2013.01); *H04N 21/4826* (2013.01)

(58) Field of Classification Search
CPC .......... H04N 21/4668; H04N 21/4532; H04N 21/44222; H04N 21/25891; H04N 21/4755; H04N 21/4826; H04N 21/252; H04N 21/4667; H04N 21/6582
See application file for complete search history.

(56) References Cited

U.S. PATENT DOCUMENTS

| 6,239,794 B1 | 5/2001 | Yuen et al. |
| 6,564,378 B1 | 5/2003 | Satterfield et al. |
| 7,165,098 B1 | 1/2007 | Boyer et al. |
| 7,761,892 B2 | 7/2010 | Ellis et al. |

(Continued)

FOREIGN PATENT DOCUMENTS

WO     WO 03/051051     6/2003

*Primary Examiner* — Jason Salce
(74) *Attorney, Agent, or Firm* — Haley Guiliano LLP

(57) ABSTRACT

Methods and systems are described for a media guidance application that provides recommendations to a user viewing a media asset. For example, the media guidance application may provide a recommendation of a media asset based on a user's profile and may modify the user's profile based on the user's actions and keywords in the content of the media asset. For example, the media guidance application may determine whether the media asset is of interest to a user and in response may update the user's profile based on keywords in the media asset. If the media guidance application determines that the media asset is of interest to the user, it may add keywords in the content of the media asset to the user's profile and increase their corresponding weights. Otherwise, the media guidance application may decrease the weights in the user's profile corresponding to keywords in the media asset.

20 Claims, 10 Drawing Sheets

(56) References Cited

U.S. PATENT DOCUMENTS

| | | | |
|---|---|---|---|
| 7,949,678 B2* | 5/2011 | Kunjithapatham | G06F 17/30038 |
| | | | 707/781 |
| 8,046,801 B2 | 10/2011 | Ellis et al. | |
| 9,510,051 B1* | 11/2016 | Bostick | H04N 21/4668 |
| 2002/0174430 A1 | 11/2002 | Ellis et al. | |
| 2003/0051252 A1* | 3/2003 | Miyaoku | H04N 7/17318 |
| | | | 725/109 |
| 2005/0251827 A1 | 11/2005 | Ellis et al. | |
| 2009/0006368 A1 | 1/2009 | Mei et al. | |
| 2009/0063279 A1 | 3/2009 | Ives et al. | |
| 2009/0178083 A1 | 7/2009 | White et al. | |
| 2009/0292732 A1 | 11/2009 | Manolescu | |
| 2009/0319883 A1 | 12/2009 | Mei et al. | |
| 2010/0153885 A1 | 6/2010 | Yates | |
| 2010/0287033 A1* | 11/2010 | Mathur | G06F 17/30867 |
| | | | 705/319 |
| 2012/0090007 A1* | 4/2012 | Xiao | H04N 5/44543 |
| | | | 725/46 |
| 2015/0181289 A1 | 6/2015 | Wheatley | |
| 2016/0142774 A1* | 5/2016 | Sayyadi-Harikandehei | |
| | | | H04N 21/4668 |
| | | | 725/14 |

* cited by examiner

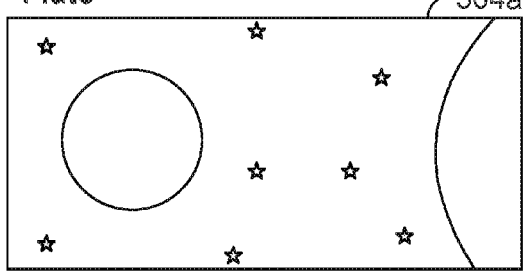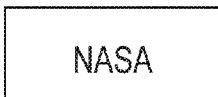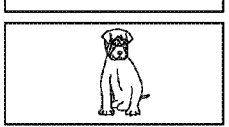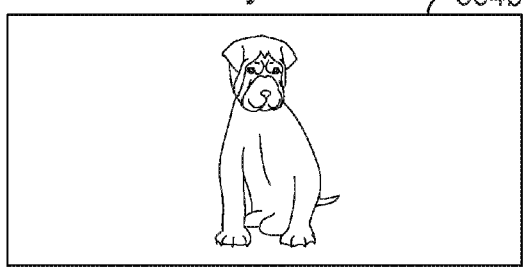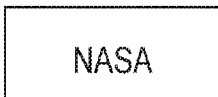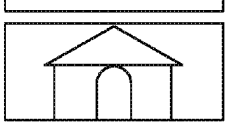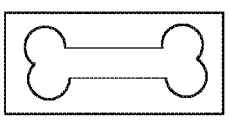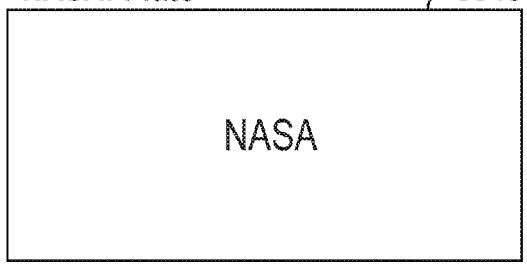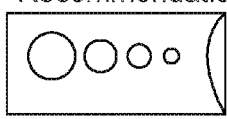
FIG. 5

800

800 ...
801 Initialization Subroutine
802 ...
803 //Routine to analyze, using control circuitry, a transcript of the first media asset to create the data structure associated with the first media asset
804
805 Retrieve audio associated with the first media asset from stored memory
806 Create a transcript of the audio by applying speech recognition to the audio
807 For each word in the transcript:
808    A = Accessed value of the word
809    B = List of unimportant words
810       If (A not in B)
811          If (A in the list of keywords already found in the transcript)
812             Increment the number of occurrences associated with the keyword using control circuitry
813          Else
814             Execute subroutine to add the word to the list of keywords found in the transcript and initialize the number of occurrences of the keyword to one using control circuitry
815
816 Execute subroutine to determine a weight reflecting the number of occurrences of a keyword for each keyword
817 Execute subroutine to store, in memory, the list of keywords found in the transcript and the number of occurrences associated with each keyword using control circuitry
818 ...
819 Termination Subroutine
820 ...

1000 ...
1001 Initialization Subroutine
1002 ...
1003 //Routine to determine, using control circuitry, whether the user profile data and second data structure are similar:
1004
1005 Receive keywords and their corresponding weights from the user profile and the second data structure
1006 For each keyword:
1007     If (keyword present in both the user profile and the second data structure)
1008         Execute subroutine to determine the difference between the weight corresponding to the keyword in the user profile and the weight corresponding to the keyword in the second data structure using control circuitry
1009     Else
1010         Determine the value of the weight corresponding to the keyword
1011
1012 Execute subroutine to determine a distance based on the differences and values using control circuitry
1013 If (distance > threshold distance)
1014     Determine that the user profile data and second data structure data are not similar
1015 Else
1016     Determine that the user profile data and second data structure data are similar
1017 ...
1018 Termination Subroutine
1019 ...

FIG. 10

| | 1200 |
|---|---|
| 1200 | ... |
| 1201 | Initialization Subroutine |
| 1202 | ... |
| 1203 | //Routine to increase, in the user profile, the plurality of weights corresponding to keywords that occur in the content of the second media asset, and add, to the user profile, keywords that occur in the content of the second media asset and are not in the user profile |
| 1204 | |
| 1205 | Retrieve a second data structure that includes a plurality of keywords that occur in the content of the second media asset and a plurality of weights that reflect a number of times each respective keyword of the plurality of keywords occurs in the content of the second media asset |
| 1206 | For each keyword: |
| 1207 |    If (keyword in the user profile) |
| 1208 |       Execute subroutine to add the weight corresponding to the keyword in the second data structure to the weight corresponding to the keyword in the user profile |
| 1209 |    Else |
| 1210 |       Execute subroutine to add the keyword and the weight corresponding to the keyword in the second data structure to the user profile |
| 1211 | |
| 1212 | Execute subroutine to store the user profile in memory |
| 1213 | ... |
| 1214 | Termination Subroutine |
| 1215 | ... |

FIG. 12

METHODS AND SYSTEMS OF RECOMMENDING MEDIA ASSETS TO USERS BASED ON CONTENT OF OTHER MEDIA ASSETS

BACKGROUND

In conventional systems, users have access to a plethora of media content. While viewing such content, users may wish to receive recommendations of other media content of interest. For example, while viewing a video, users may wish to receive recommendations of other related videos to view. Current methods and systems do not utilize all of the information in the content of media assets to determine whether a media asset is to be recommended.

SUMMARY

Accordingly, methods and systems are described herein for a media guidance application that provides recommendations of media assets to a user viewing a media asset. The media guidance application may utilize user actions and keywords in the content of the media asset when determining other media assets to recommend. Moreover, the media guidance application may recommend live streaming media assets. For example, the media guidance application may identify a live streaming media asset that is related to a first media asset that a user is viewing and may recommend the live streaming media asset to the user. More specifically, the media guidance application may identify and recommend a live streaming media asset that is relevant to a user viewing a first media asset based on the keywords in the content of the media assets and the user's actions.

For example, a user may select "Pluto," a video about the dwarf planet in our solar system. The media guidance application may generate for display "Pluto." The media guidance application may modify the user's profile to include the keywords that occur in "Pluto" and the number of times each keyword occurs in "Pluto." The media guidance application may generate for display recommendations of other videos that have similar keywords in their content. One such video is "Pluto and Mickey," in which the keyword "Pluto" occurs a number of times.

After viewing "Pluto," the user may decide to find out more about the dwarf planet by selecting one of the videos that is recommended by the media guidance application such as "Pluto and Mickey." The media guidance application may generate for display "Pluto and Mickey," and may generate for display recommendations of other videos. Although "Pluto" and "Pluto and Mickey" have some of the same keywords, the content of "Pluto and Mickey," which is about the friendship of a mouse and dog, is clearly not relevant to the user's interests of the dwarf planet.

After viewing "Pluto and Mickey" for a short amount of time, the user may realize that the video is not of interest and may select another video from the recommendations such as "NASA: Pluto." The media guidance application may determine that the period of time that the user viewed "Pluto and Mickey" was short and in response may modify the user's profile so that future recommendations are more aligned with the user's interests. Specifically, the media guidance application may update the user's profile with keywords that occur in the content of "Pluto and Mickey" and the number of times each keyword occurs in "Pluto and Mickey" to prevent future recommendations of similar videos. For example, the media guidance application may add keywords such as "dog" and "bone" to the user profile to indicate that videos with many occurrences of these keywords should not be recommended to the user.

In response to the user's selection of "NASA: Pluto," the media guidance application may generate for display "NASA: Pluto" and recommendations of other videos. The recommendations may not include videos similar to "Mickey and Pluto" because videos with many occurrences of keywords such as "dog" and "bone" are no longer recommended.

Because "NASA: Pluto" is of interest to the user, the user may view the entirety of the video. The media guidance application may determine that the user viewed "NASA: Pluto" for a long period of time and in response may modify the user profile to increase future recommendations of similar videos. Specifically, the media guidance application may update the user's profile with keywords that occur in the content of "NASA: Pluto" and the number of times each keyword occurs in "NASA: Pluto." For example, the media guidance application may add keywords such as "NASA" and "space" to the user profile to indicate that videos with occurrences of these keywords should be recommended to the user.

In some aspects, the media guidance application may receive a first user selection of a first media asset, wherein the first media asset is associated with a data structure that includes a plurality of keywords that occur in a content of the first media asset and a plurality of weights that reflect a number of times each respective keyword of the plurality of keywords occurs in the content of the first media asset. For example, the media guidance application may receive a user's selection of a first video that is associated with a data structure that includes the keywords that occur in the first video and weights that reflect the number of occurrences of each keyword. The media guidance application may, in response to receiving the first user selection of the first media asset, generate for display the first media asset. For example, the media guidance application may generate for display the first video, in response to the user's selection of the first video.

The media guidance application may modify a user profile associated with the user, based on the plurality of keywords asset and the plurality of weights associated with the first media. For example, the media guidance application may modify a user profile associated with the user based on the keywords that occur in the first video and their corresponding weights.

The media guidance application may generate for display a recommendation of a second media asset to the user based on the user profile. For example, the media guidance application may generate for display a recommendation of a second video for the user based on the user profile. The media guidance application may receive a second user selection of the second media asset by the user. For example, the media guidance application may receive the user's selection of the second video. The media guidance application may, in response to receiving the second user selection of the second media asset, generate for display the second media asset. For example, the media guidance application may generate for display the second video, in response to the user's selection of the second video.

The media guidance application may, after a period of time, receive a third user selection to change the display of the second media asset to a display of a third media asset. For example, after a period of time, the user may select a third video and the media guidance application may receive the user's selection of the third video. The media guidance application may determine whether the period of time is greater than a threshold time. For example, the media guidance application may determine whether the period of time the user spent viewing the second video is greater than a threshold time.

The media guidance application may, in response to determining that the period of time is greater than the threshold time, modify the user profile by increasing a plurality of weights in the user profile corresponding to keywords that occur in a content of the second media asset and adding keywords that occur in the content of the second media asset and are not in the user profile. For example, the media guidance application may, in response to determining that the user viewed the second video for longer than the threshold time, modify the user profile by increasing the weights in the user profile, corresponding to keywords that occur in the second video and adding keywords, and their corresponding weights, that occur in the second video and are not already in the user profile.

The media guidance application may, in response to determining that the period of time is not greater than the threshold time, modify the user profile by decreasing the plurality of weights in the user profile corresponding to keywords in the content of the second media asset and adding keywords that occur in the content of the second media asset and are not in the user profile. For example, the media guidance application may, in response to determining that the user did not view the second video for longer than the threshold time, modify the user profile by decreasing the weights, in the user profile, corresponding to keywords that occur in the second video and adding keywords, and the negative of their corresponding weights, that occur in the second video and are not already in the user profile.

In some embodiments, keywords may be words that occur in a media asset. For example, keywords associated with the first video are words that occur in the first video.

In some embodiments, the data structure may be created by analyzing a transcript of the first media asset for keywords, wherein the transcript is one of text created by applying speech recognition to audio associated with the first media asset and closed captions/subtitles associated with the first media asset. For example, the data structure associated with the first video may be created by analyzing a transcript of the first video, wherein the transcript is either the text created by applying speech recognition to the audio of the first video or the closed captions/subtitles associated with the first video.

In some embodiments, the data structure may be created using words in the display surrounding the media asset. For example, the words in the title of the video (e.g., title 502a, 502b, 502c (FIG. 5)) may be used to create the data structure associated with the video.

In some embodiments, the data structure may be created using words found in the content of the media asset using automatic content recognition techniques such as optical character recognition. For example, the data structure associated with a video of a PowerPoint presentation may include the words in the PowerPoint presentation that were identified using optical character recognition.

In some embodiments, a weight may correspond to a frequency at which the keyword corresponding to the weight occurs, wherein the frequency is an average number of times the keyword occurs per a unit time. For example, the weights corresponding to the number of occurrences of each keyword in the first video are frequencies at which the keywords appear in the first video. For example, a keyword "Pluto" may have a weight of three in the first data structure if it occurs in the first video an average frequency of three times per minute.

In some embodiments, the media guidance application may generate for display a recommendation of a second media asset to the user based on the user profile by comparing data associated with the second media asset to data in the user profile. For example, the user may be interested to view videos generated by a certain person and may add the person to the user profile to indicate the interest. The media guidance application may identify a live video generated by the person and may compare the user profile data to the video data. The media guidance application may determine that the user profile indicates an interest in the person who generated the video and, in response, may generate for display a recommendation of the video to the user.

In some embodiments, the media guidance application may generate for display a recommendation of a second media asset to the user based on the user profile by retrieving a second data structure that includes a plurality of keywords that occur in the content of the second media asset and a plurality of weights that reflect a number of times each respective keyword of the plurality of keywords occurs in the content of the second media asset. For example, the media guidance application may retrieve a second data structure, associated with the second video, including keywords that occur in the second video and weights that reflect the number of times each respective keyword occurs in the second video.

The media guidance application may determine whether the user profile data and the second data structure data are similar. For example, the media guidance application may determine whether the keywords and their corresponding weights from the user profile are similar to the keywords and their corresponding weights from the second data structure. The media guidance application may, in response to determining that the user profile and the second data structure are similar, generate for display a recommendation of the second media asset to the user. For example, the media guidance application may, in response to determining that the keywords and their corresponding weights from the user profile are similar to the keywords and their corresponding weights from the second data structure, generate for display a recommendation of the second video.

In some embodiments, the media guidance application may determine whether the user profile data and the second data structure data are similar by determining a difference between a first weight of the plurality of weights in the user profile, corresponding to a keyword, and a second weight of the plurality of weights in the second data structure, corresponding to said keyword, for each keyword that is present in both the user profile and the second data structure. For example, the media guidance application may, for each keyword that is in both the user profile and the second data structure, determine the difference between the weight corresponding to the keyword in the user profile and the weight corresponding to the keyword in the second data structure.

The media guidance application may determine a value of a third weight of the plurality of weights in the user profile or in the second data structure, corresponding to a keyword, for each keyword that is present in one of the user profile and the second data structure and not present in both the user profile and the second data structure. For example, the media guidance application may, for each keyword that is present in one of the user profile and the second data structure but not both, determine the value of the weight associated with the keyword.

The media guidance application may determine a distance based on the differences and values. For example, the media guidance application may determine a distance based on all the determined differences and values. The media guidance application may determine whether the distance is greater than a threshold distance. For example, the media guidance application may determine whether the distance is greater than a predefined threshold distance.

The media guidance application may, in response to determining that the distance is greater than the threshold distance, determine that the user profile data and second data structure data are not similar. For example, the media guidance application may determine that the user profile data and second data structure data are not similar, in response to determining that the distance is greater than the predefined threshold distance.

The media guidance application may, in response to determining that the distance is not greater than the threshold distance, determine that the user profile data and second data structure data are similar. For example, the media guidance application may determine that the user profile data and second data structure data are similar, in response to determining that the distance is less than or equal to the predefined threshold distance.

In some embodiments, the threshold time may be one of a fixed amount of time, and a time relative to a length of the second media asset. For example, the threshold time may be a fixed time (e.g., one minute). In another example, the threshold time may be a time relative to the length of the second video (e.g., 10% of the length of the second video). For example, if the second video is 30 minutes, the threshold time may be 10% of the 30 minutes, or 3 minutes.

In some embodiments, the media guidance application may increase the plurality of weights in the user profile corresponding to keywords that occur in the content of the second media asset and add keywords that occur in the content of the second media asset and are not in the user's profile by retrieving a second data structure that includes a plurality of keywords that occur in the content of the second media asset and a plurality of weights that reflect a number of times each respective keyword of the plurality of keywords occurs in the content of the second media asset. For example, the media guidance application may retrieve a second data structure, associated with the second video, including keywords that occur in the second video and weights that reflect the number of times each respective keyword occurs in the second video. The media guidance application may add a first weight of the plurality of weights in the second data structure, corresponding to a keyword, to a second weight of the plurality of weights in the user profile, corresponding to said keyword, for each keyword that is present in both the second data structure data and the user profile data. For example, the media guidance application may, for each keyword that is present in both the user profile and the second data structure, add the weight, corresponding to the keyword, in the second data structure to the weight, corresponding to the keyword, in the user profile. The media guidance application may add a keyword of the plurality of keywords in the second data structure and a weight of the plurality of weights in the second data structure, corresponding to said keyword, to the user profile for each keyword that is present in the second data structure and is not present in the user profile. For example, the media guidance application may, for each keyword that is present in the second data structure and not present in the user profile, add the keyword and its corresponding weight in the second data structure to the user profile.

In some embodiments, the media guidance application may decrease the plurality of weights in the user profile corresponding to keywords in the content of the second media asset and add keywords that occur in the content of the second media asset and are not in the user's profile by retrieving a second data structure that includes a plurality of keywords that occur in the content of the second media asset and a plurality of weights that reflect a number of times each respective keyword of the plurality of keywords occurs in the content of the second media asset. For example, the media guidance application may retrieve a second data structure, associated with the second video, including keywords that occur in the second video and weights that reflect the number of times each respective keyword occurs in the second video. The media guidance application may subtract a first weight of the plurality of weights in the second data structure, corresponding to a keyword, from a second weight of the plurality of weights in the user profile, corresponding to said keyword, for each keyword that is present in both the second data structure and the user profile. For example, the media guidance application may, for each keyword that is present in both the second data structure and the user profile data, subtract the weight corresponding to the keyword in the second data structure from the weight corresponding to the keyword in the user profile. The media guidance application may add a keyword of the plurality of keywords in the second data structure and a negative of a weight of the plurality of weights in the second data structure, corresponding to said keyword, to the user profile for each keyword that is present in the second data structure and is not present in the user profile. For example, the media guidance application may, for each keyword that is present in the second data structure and not present in the user profile, add the keyword and the negative of its corresponding weight in the second data structure, to the user profile.

In some embodiments, the media guidance application may determine whether a weight of the plurality of weights in the user profile is less than or equal to zero. For example, the media guidance application may determine whether a weight corresponding to a keyword in the user profile is not greater than zero. The media guidance application may, in response to determining that the weight of the plurality of weights in the user profile is less than or equal to zero, remove the weight and its corresponding keyword from the user profile. For example, the media guidance application may, in response to determining that the weight corresponding to the keyword in the user profile is not greater than zero, remove the weight and its corresponding keyword from the user profile.

In some embodiments, the second media asset may be a live video stream. For example, the second media asset may be a video being live streamed from its source.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 5 shows three illustrative displays that may be used to provide recommendations in accordance with some embodiments of the disclosure;

FIG. 8 is a flow-chart of an illustrative example of pseudocode for analyzing a transcript of a media asset in accordance with some embodiments of the disclosure;

FIG. 10 is a flow-chart of an illustrative example of pseudocode for comparing data in a user profile data and data in a data structure associated with a media asset in accordance with some embodiments of the disclosure;

FIG. 12 is a flow-chart of an illustrative example of pseudocode for increasing, in the user profile, a plurality of weights corresponding to keywords that occur in a content of a media asset and adding, to the user profile, keywords that occur in the content of the media asset and are not in the user profile in accordance with some embodiments of the disclosure.

DETAILED DESCRIPTION OF THE DRAWINGS

Figure 1:
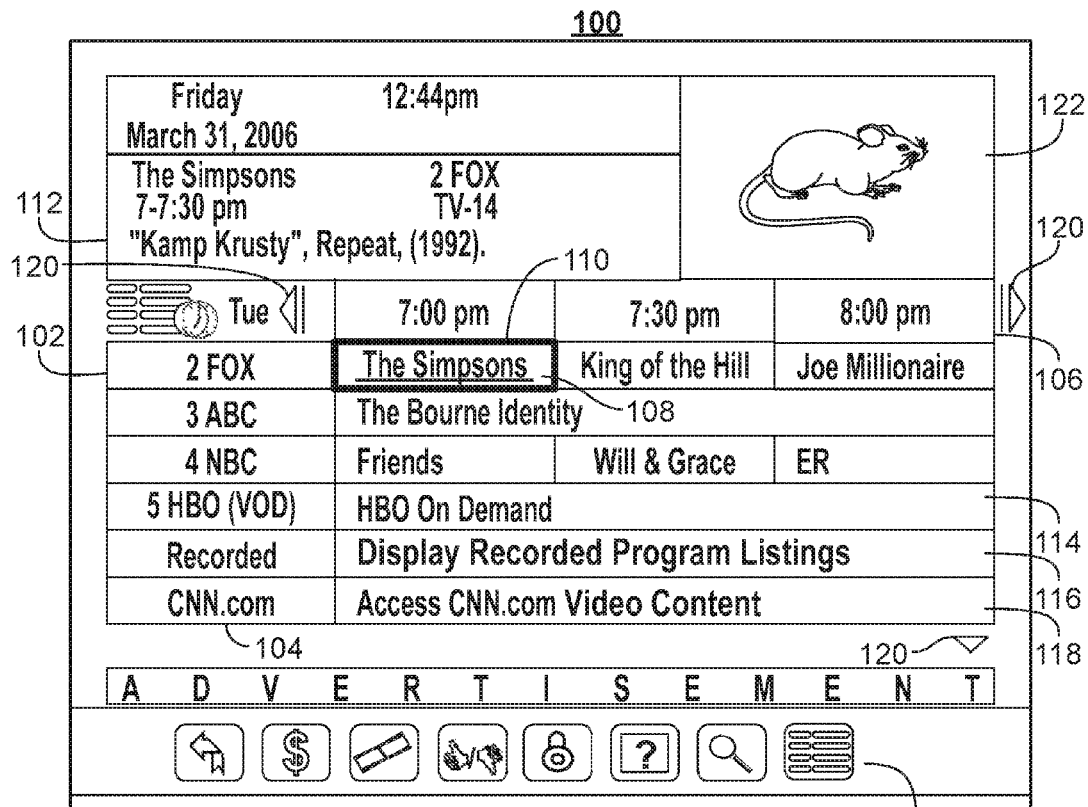
FIG. 1 shows an illustrative media listing display in accordance with some embodiments of the disclosure.

Methods and systems are described herein for a media guidance application that provides recommendations of media assets to a user viewing a media asset. The media guidance application may utilize user actions and keywords in the content of the media asset when determining other media assets to recommend. Moreover, the media guidance application may recommend live streaming media assets. For example, the media guidance application may identify a live streaming media asset that is related to a first media asset that a user is viewing and may recommend the live streaming media asset to the user. More specifically, the media guidance application may identify and recommend a live streaming media asset that is relevant to a user viewing a first media asset based on the keywords in the content of the media assets and the user's actions.

For example, a user may select "Pluto," a video about the dwarf planet in our solar system. The media guidance application may generate for display "Pluto." The media guidance application may modify the user's profile to include the keywords that occur in "Pluto" and the number of times each keyword occurs in "Pluto." The media guidance application may generate for display recommendations of other videos that have similar keywords in their content. One such video is "Pluto and Mickey," in which the keyword "Pluto" occurs a number of times.

After viewing "Pluto," the user may decide to find out more about the dwarf planet by selecting one of the videos that is recommended by the media guidance application such as "Pluto and Mickey." The media guidance application may generate for display "Pluto and Mickey," and may generate for display recommendations of other videos. Although "Pluto" and "Pluto and Mickey" have some of the same keywords, the content of "Pluto and Mickey," which is about the friendship of a mouse and dog, is clearly not relevant to the user's interests of the dwarf planet.

After viewing "Pluto and Mickey" for a short amount of time, the user may realize that the video is not of interest and may select another video from the recommendations such as "NASA: Pluto." The media guidance application may determine that the period of time that the user viewed "Pluto and Mickey" was short and in response may modify the user's profile so that future recommendations are more aligned with the user's interests. Specifically, the media guidance application may update the user's profile with keywords that occur in the content of "Pluto and Mickey" and the number of times each keyword occurs in "Pluto and Mickey" to prevent future recommendations of similar videos. For example, the media guidance application may add keywords such as "dog" and "bone" to the user profile to indicate that videos with many occurrences of these keywords should not be recommended to the user.

In response to the user's selection of "NASA: Pluto," the media guidance application may generate for display "NASA: Pluto" and recommendations of other videos. The recommendations may not include videos similar to "Mickey and Pluto" because videos with many occurrences of keywords such as "dog" and "bone" are no longer recommended.

Because "NASA: Pluto" is of interest to the user, the user may view the entirety of the video. The media guidance application may determine that the user viewed "NASA: Pluto" for a long period of time and in response may modify the user profile to increase future recommendations of similar videos. Specifically, the media guidance application may update the user's profile with keywords that occur in the content of "NASA: Pluto" and the number of times each keyword occurs in "NASA: Pluto." For example, the media guidance application may add keywords such as "NASA" and "space" to the user profile to indicate that videos with occurrences of these keywords should be recommended to the user.

As defined herein, the term "keyword" means a substantive word. In some embodiments, a keyword may be a substantive word associated with a media asset. For example, a keyword in a video, "NASA: Pluto," may be "Pluto," "NASA," "planet," or "space." In some embodiments, a keyword may occur in the content of a media asset. For example, a keyword may be in the dialogue associated with a media asset or may appear visually in the media asset. For example, the word "planet" may be spoken in the video, "NASA: Pluto," making "planet" a keyword that occurs in the content of "NASA: Pluto." In another example, the word "space" may appear visually in the video, "NASA: Pluto," making "space" a keyword that occurs in the content of "NASA: Pluto."

As referred to herein, an "unimportant word" that occurs in the content of a media asset is a word that is not essential in describing the content. For example, an unimportant word may be "a," "an," "the," "of," "with," etc. In contrast, an important word that occurs in the content of a media asset is a word that helps describe the content. For example, an important word may be "Pluto," "NASA," "dog," "planet," "space," "house," etc.

As defined herein, a "weight" is a number describing the number of occurrences of a word, or the frequency at which the word occurs. In some embodiments, weights may be associated with keywords that occur in a media asset. For example, a video "NASA: Pluto" may have a weight of 10 for the word "Pluto" and a weight of 5 for the word "NASA," meaning the word "Pluto" occurs 10 times in the video and the word "NASA" occurs 5 times. In some embodiments, a weight may be normalized based on other weights associated with the same media asset. For example, a video "NASA: Pluto" may have a weight of 0.05 for the word "Pluto," meaning that 5% of the keywords occurring in the video are the word "Pluto."

As defined herein, the term "data structure" is a format for organizing and storing data. For example, a data structure may include strings, representing keywords, and a number, representing a weight, for each string. In some embodiments, a data structure is associated with a media asset and contains the keywords that occur in the media asset and a weight corresponding to each respective keyword. In some embodiments, a data structure is associated with a user. For example, the data structure may be a user profile that includes keywords and a weight for each keyword representing the user's interest in the keyword.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
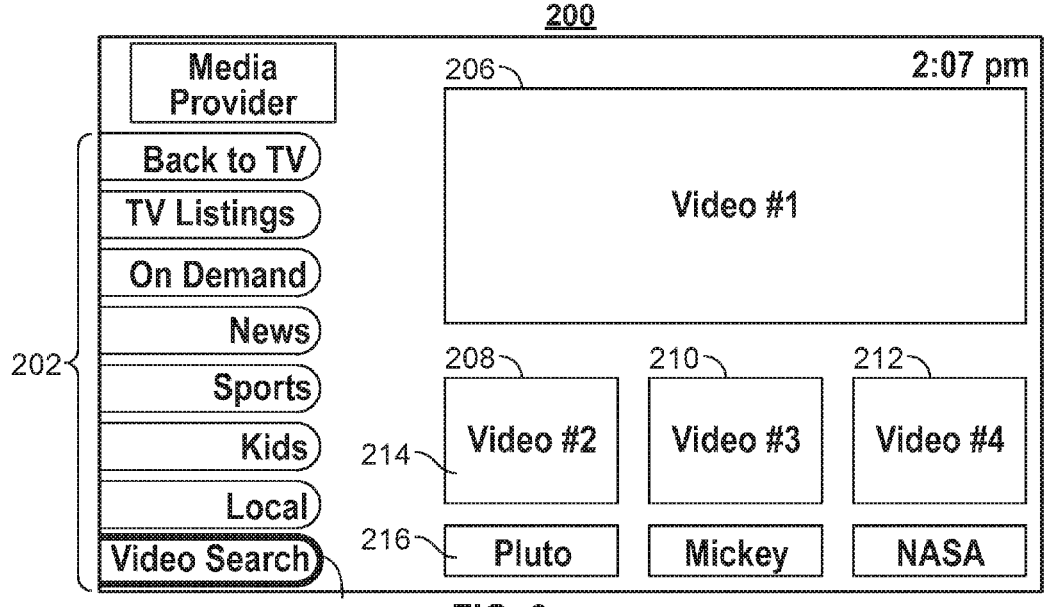
FIG. 2 shows another illustrative media listing display that may be used to provide recommendations in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, video search option 204 is selected, thus providing media asset 206 and listings 208, 210, and 212 as recommendations for other media assets. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The media asset and listings in display 200 are of different sizes (i.e., media asset 206 is larger than listings 208, 210, and 212), but if desired, the media asset and all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 3:
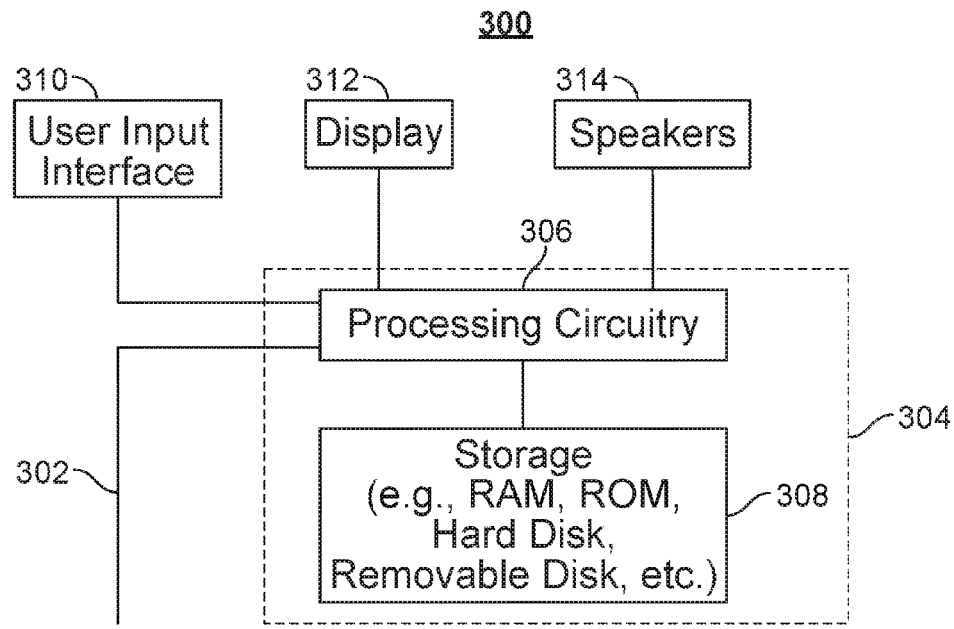
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
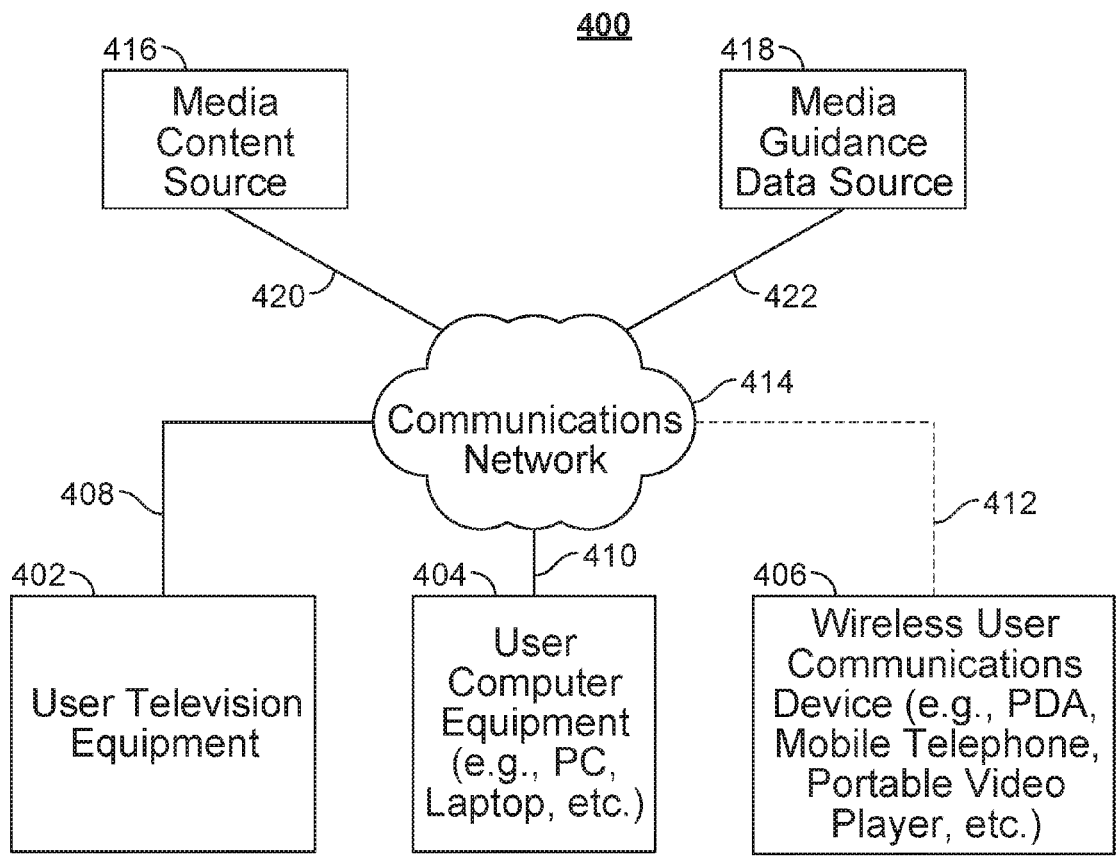
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data source includes a database to store media guidance data.

In some embodiments, the media guidance data may include a user profile. For example, the user profile may include data about a user. In some embodiments, data in a user profile includes keywords and a weight for each respective keyword, representing a user's interest in the keyword.

In some embodiments, media guidance data may include a data structure associated with a media asset. The data structure may include keywords that occur in the media asset and a weight for each respective keyword, corresponding to the number of times the keyword occurs in the media asset.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

FIG. 5 shows illustrative displays 500, 520, and 540, which are used to provide recommendations 506a, 506b, 506c related to videos 504a, 504b, 504c, in accordance with some embodiments of the disclosure. For example, a user selects "Pluto," a video about the dwarf planet in our solar system. As shown in display 500, the media guidance application generates for display "Pluto." The media guidance application modifies the user's profile to include the keywords that occur in "Pluto" and the number of times each keyword occurs in "Pluto." The media guidance application generates for display recommendations 506a of other videos that have similar keywords in their content. One such video is "Pluto and Mickey," in which the keyword "Pluto" occurs a number of times.

After viewing "Pluto," the user decides to find out more about the dwarf planet by selecting one of the videos that is recommended by the media guidance application such as "Pluto and Mickey." As shown in display 520, the media guidance application generates for display "Pluto and Mickey," and generates for display recommendations 506b of other videos. Although "Pluto" and "Pluto and Mickey" have some of the same keywords, the content of "Pluto and Mickey," which is about the friendship of a mouse and dog, is clearly not relevant to the user's interests of the dwarf planet.

After viewing "Pluto and Mickey" for a short amount of time, the user realizes that the video is not of interest and selects another video from the recommendations 506c, "NASA: Pluto." The media guidance application determines that the period of time that the user viewed "Pluto and Mickey" was short and in response modifies the user's profile so that future recommendations are more aligned with the user's interests. Specifically, the media guidance application updates the user's profile with keywords that occur in the content of "Pluto and Mickey" and the number of times each keyword occurs in "Pluto and Mickey" to prevent future recommendations of similar videos. For example, the media guidance application may add keywords such as "dog" and "bone" to the user profile to indicate that videos with many occurrences of these keywords should not be recommended to the user. The media guidance application may add the weights associated with "dog" and "bone" from the data structure associated with the video to the user profile since neither the keywords nor their corresponding weights were in the user profile. In addition, the media guidance application may reduce the weights that correspond to keywords that occur in the content of "Pluto and Mickey" and are already in the user profile. This process is discussed in greater detail with respect to step 620 (FIG. 6).

In response to the user's selection of "NASA: Pluto," the media guidance application generates for display "NASA: Pluto" and recommendations 506c of other videos, as shown in display 540. The recommendations do not include videos similar to "Mickey and Pluto" because videos with many occurrences of keywords such as "dog" and "bone" are no longer recommended.

Because "NASA: Pluto" is of interest to the user, the user views the entirety of the video. The media guidance application determines that the user viewed "NASA: Pluto" for a long period of time and in response modifies the user profile to increase future recommendations of similar videos. Specifically, the media guidance application updates the user's profile with keywords that occur in the content of "NASA: Pluto" and the number of times each keyword occurs in "NASA: Pluto." For example, the media guidance application may add keywords such as "NASA" and "space" to the user profile to indicate that videos with occurrences of these keywords should be recommended to the user.

Figure 6:
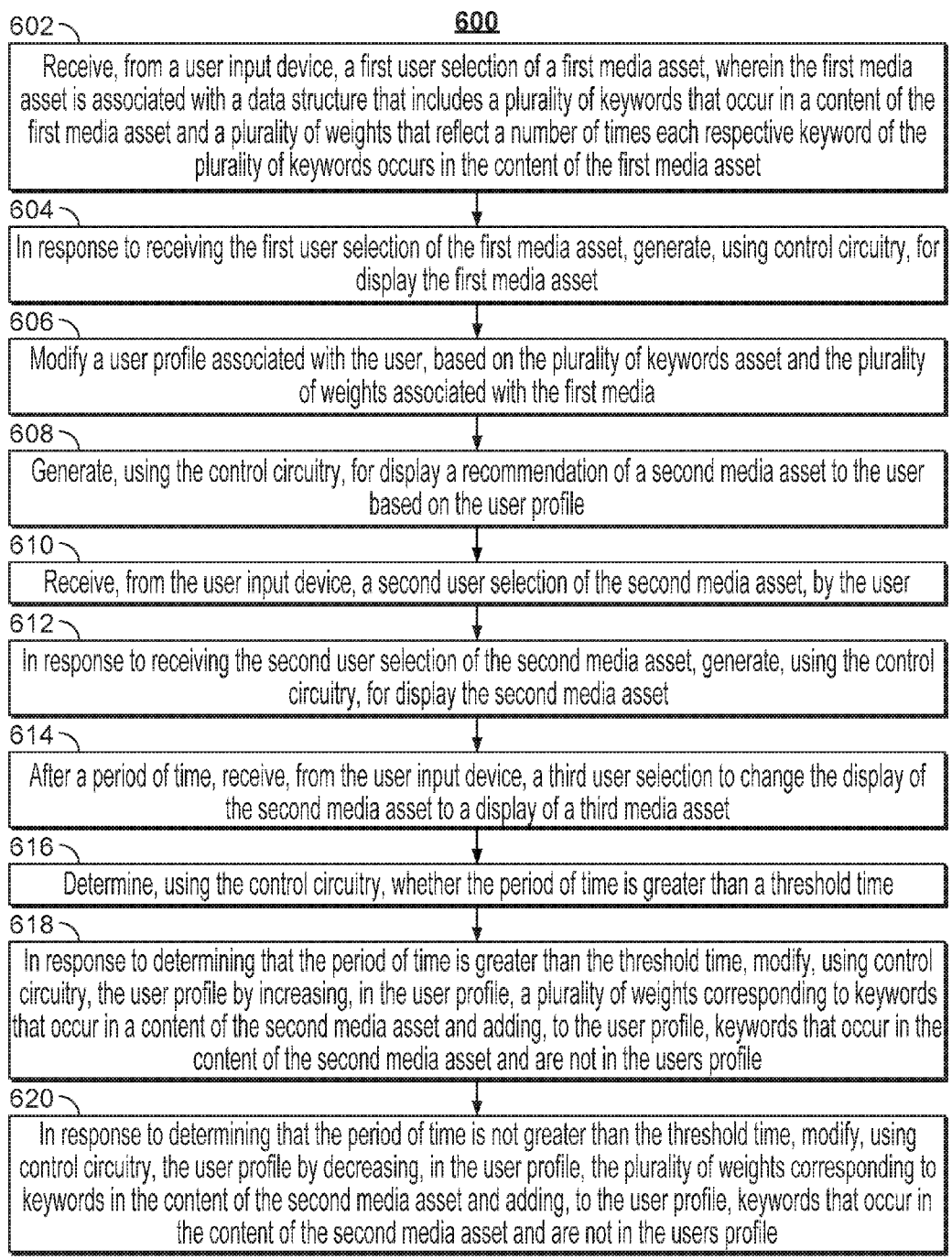
FIG. 6 is a flow-chart of illustrative steps for modifying a user profile to improve recommendations in accordance with some embodiments of the disclosure.

FIG. 6 is a flowchart of illustrative steps for recommending a media asset to a user and modifying a user profile based on user activity. Process 600 may be used to present a recommendation of a media asset (e.g., listings 208, 210, 212 (FIG. 2)) on display device (e.g., display 312 (FIG. 3)). It should be noted that process 600 or any steps thereof could occur on, or be provided by, any of the devices shown in FIGS. 3-4. For example, process 600 may be executed by control circuitry 304 (FIG. 3) as instructed by the media guidance applications (e.g., implemented on any of the devices shown and described in FIG. 4).

At step 602, the media guidance application receives (e.g., via control circuitry 304 (FIG. 3)) a first user selection, from a user input device (e.g., user input interface 310 (FIG. 3)), of a first media asset, wherein the first media asset is associated with a data structure that includes a plurality of keywords that occur in a content of the first media asset and a plurality of weights that reflect a number of times each respective keyword of the plurality of keywords occurs in the content of the first media asset. For example, the media guidance application may receive a user's selection of a first video that is associated with a data structure that includes the keywords that occur in the first video and weights that reflect the number of occurrences of each keyword.

At step 604, the media guidance application, in response to receiving the first user selection of the first media asset, generates (e.g., via control circuitry 304 (FIG. 3)) for display the first media asset. For example, the media guidance application may generate for display the first video, in response to the user's selection of the first video. For example, as discussed with respect to FIG. 5, when the user selects "Pluto," the media guidance application generates for display the video 504a, "Pluto."

At step 606, the media guidance application modifies (e.g., via control circuitry 304 (FIG. 3)) a user profile associated with the user, based on the plurality of keywords asset and the plurality of weights associated with the first media. For example, the media guidance application may modify a user profile associated with the user based on the keywords that occur in the first video and their corresponding weights.

At step 608, the media guidance application generates (e.g., via control circuitry 304 (FIG. 3)) for display a recommendation of a second media asset to the user based on the user profile. For example, the media guidance application may generate for display a recommendation of a second video for the user based on the user profile. For example, as discussed with respect to FIG. 5, the media guidance application generates for display recommendations 506a, including "Pluto and Mickey," based on the user profile.

At step 610, the media guidance application receives (e.g., via control circuitry 304 (FIG. 3)) a second user selection, from the user input device (e.g., user input interface 310 (FIG. 3)), of the second media asset, by the user. For example, the media guidance application may receive the user's selection of the second video. For example, as discussed with respect to FIG. 5, the user selects "Pluto and Mickey" from the recommendations 506a.

At step 612, the media guidance application, in response to receiving the second user selection of the second media asset, generates (e.g., via control circuitry 304 (FIG. 3)) for display the second media asset. For example, the media guidance application may generate for display the second video, in response to the user's selection of the second video. For example, as discussed with respect to FIG. 5, when the user selects "Pluto and Mickey," the media guidance application generates for display the video 504b, "Pluto and Mickey."

At step 614, the media guidance application, after a period of time, receives (e.g., via control circuitry 304 (FIG. 3)) a third user selection (e.g., via user input interface 310 (FIG. 3)) to change the display of the second media asset (e.g., media asset 206 (FIG. 2)) to a display of a third media asset. For example, after a period of time, the user may select a third video and the media guidance application may receive the user's selection of the third video. For example, as discussed with respect to FIG. 5, the user selects "NASA: Pluto" after a period of time, and the media guidance application generates for display the video 504c, "NASA: Pluto."

At step 616, the media guidance application determines (e.g., via control circuitry 304 (FIG. 3)) whether the period of time is greater than a threshold time. For example, the media guidance application may determine whether the period of time the user spent viewing the second video is greater than a threshold time. The threshold time describes a period of time that a user will exceed if the user is interested in the content of the media asset the user is viewing, and will not exceed if the user is not interested in the content of the media asset the user is viewing. In some embodiments, the media guidance application determines the period of time by storing the time that has elapsed in the media asset when the user changes the display to a display of another media asset. For example, if the user is 10 seconds into the video "Pluto and Mickey" when the user selects "NASA: Pluto," then the media guidance application determines the period of time to be 10 seconds. For example, as discussed with respect to FIG. 5, when the user selects "NASA: Pluto," the media guidance application determines that the user is not interested in the video "Pluto and Mickey," because the user did not view "Pluto and Mickey" for a period of time greater than the threshold time.

At step 618, the media guidance application, in response to determining that the period of time is greater than the threshold time, modifies (e.g., via control circuitry 304 (FIG. 3)) the user profile by increasing, in the user profile, a plurality of weights corresponding to keywords that occur in a content of the second media asset and adding, to the user profile, keywords that occur in the content of the second media asset and are not in the user profile. For example, the media guidance application may, in response to determining that the user viewed the second video for longer than the threshold time, modify the user profile by increasing the weights in the user profile, corresponding to keywords that occur in the second video and adding keywords, and their corresponding weights, that occur in the second video and are not already in the user profile.

At step 620, the media guidance application, in response to determining that the period of time is not greater than the threshold time, modifies (e.g., via control circuitry 304 (FIG. 3)) the user profile by decreasing, in the user profile, the plurality of weights corresponding to keywords in the content of the second media asset and adding, to the user profile, keywords that occur in the content of the second media asset and are not in the user profile. For example, the media guidance application may, in response to determining that the user did not view the second video for longer than the threshold time, modify the user profile by decreasing the weights, in the user profile, corresponding to keywords that occur in the second video and adding keywords, and the negative of their corresponding weights, that occur in the second video and are not already in the user profile. For example, as discussed with respect to FIG. 5, when the media guidance application determines that the user is not interested in the video "Pluto and Mickey," it reduces the weights in the user profile corresponding to keywords that occur in the content of "Pluto and Mickey."

In some embodiments, keywords may be words that occur in a media asset. For example, keywords associated with the first video are words that occur in the first video.

In some embodiments, the data structure associated with the first media asset may be created by analyzing (e.g., via control circuitry 304 (FIG. 3)) a transcript of the first media asset for keywords, wherein the transcript is one of text created by applying speech recognition to audio associated with the first media asset and closed captions/subtitles associated with the first media asset. For example, the data structure associated with the first video may be created by analyzing a transcript of the first video, wherein the transcript is either the text created by applying speech recognition to the audio of the first video or the closed captions/subtitles associated with the first video. This process is discussed in greater detail with respect to FIGS. 7 and 8.

In some embodiments, a weight may correspond to a frequency at which a keyword corresponding to the weight occurs, wherein the frequency is an average number of times the keyword occurs per a unit time. For example, the weights corresponding to the number of occurrences of each keyword in the first video are frequencies at which the keywords appear in the first video. For example, a keyword "Pluto" may have a weight of three in the first data structure if it occurs in the first video an average frequency of three times per minute.

In some embodiments, the media guidance application may generate (e.g., via control circuitry 304 (FIG. 3)) for display a recommendation of a second media asset to the user based on the user profile by retrieving (e.g., from storage circuitry 308 (FIG. 3) and/or any location accessible via communications network 414 (FIG. 4)) a second data structure that includes a plurality of keywords that occur in the content of the second media asset and a plurality of weights that reflect a number of times each respective keyword of the plurality of keywords occurs in the content of the second media asset. For example, the media guidance application may retrieve a second data structure, associated with the second video, including keywords that occur in the second video and weights that reflect the number of times each respective keyword occurs in the second video. The media guidance application may determine (e.g., via control circuitry 304 (FIG. 3)) whether the user profile data and the second data structure data are similar. For example, the media guidance application may determine whether the keywords and their corresponding weights from the user profile are similar to the keywords and their corresponding weights from the second data structure. This process is discussed in greater detail with respect to FIGS. 9 and 10.

The media guidance application may, in response to determining that the user profile and the second data structure are similar, generate (e.g., via control circuitry 304 (FIG. 3)) for display a recommendation of the second media asset to the user. For example, the media guidance application may, in response to determining that the keywords and their corresponding weights in the user profile are similar to the keywords and their corresponding weights in the second data structure, generate for display a recommendation of the second video.

In some embodiments, the media guidance application may determine whether the user profile data and the second data structure data are similar by comparing their statistical correlation to a predefined threshold. In some embodiments, the media guidance application may determine whether two media assets are similar by comparing the statistical correlation of their associated data structure data to a predefined threshold. For example, the media guidance application may determine a coefficient of correlation measuring the statistical correlation between the data in the two data structures associated with the media assets. The media guidance application may compare the coefficient of correlation to a predefined threshold coefficient to determine whether the two media assets have a strong positive correlation and are therefore similar.

In some embodiments, the media guidance application may determine whether the user profile data and the second data structure data are similar by determining (e.g., via control circuitry 304 (FIG. 3)) a difference between a first weight of the plurality of weights in the user profile, corresponding to a keyword, and a second weight of the plurality of weights in the second data structure, corresponding to said keyword, for each keyword that is present in both the user profile and the second data structure. For example, the media guidance application may, for each keyword that is in both the user profile and the second data structure, determine the difference between the weight corresponding to the keyword in the user profile and the weight corresponding to the keyword in the second data structure. This process is discussed in greater detail with respect to FIGS. 9 and 10. For example, in FIG. 5 display 500, the user profile may include the following keywords and corresponding weights: "Pluto," 0.5; "NASA," 0.3; "space," 0.2. The weight corresponding to each keyword in the user profile indicates the user's interest in media assets with the keyword. A greater weight may indicate a stronger interest in media assets with the keyword. The second data structure associated with the second media asset, "Pluto and Mickey," may include the following keywords and corresponding weights: "Pluto," 0.3; "space," 0.1; "dog," 0.4; and "house," 0.2. The keywords in the second data structure are important words that occur in the content of the media asset, "Pluto and Mickey," and the weight associated with each keyword is an indication of the number of times the keyword occurs in the media asset. Using the user profile to represent the user's interest and the second data structure to represent the media asset, "Pluto and Mickey," the media guidance application may compare the user profile and second data structure to determine if the user would be interested in the media asset. The media guidance application may determine whether to recommend "Pluto and Mickey" to the user by determining whether the user profile and the second data structure are similar. The media guidance application may determine the difference in the weights corresponding to the keywords "Pluto" and "space" since the keywords are present in both the user profile and the second data structures. The difference in weights for "Pluto" is 0.2 and the difference in the weights for "space" is 0.1.

The media guidance application may determine (e.g., via control circuitry 304 (FIG. 3)) a value of a third weight of the plurality of weights in the user profile or in the second data structure, corresponding to a keyword, for each keyword that is present in one of the user profile and the second data structure and not present in both the user profile and the second data structure. For example, for each keyword that is present in one of the user profile and the second data structure but not both, the media guidance application may determine the value of the weight associated with the keyword where it is present. For example, "NASA" is a keyword that is present in the user profile but not present in the second data structure, so the media guidance application may determine the value of the weight corresponding to "NASA" to be the weight in the user profile, 0.3. In another example, the media guidance application may determine the values of the weights in the second data structure corresponding to the keywords "dog" and "house," since the keywords are present in the second data structure and not in the user profile. The value for "dog" is 0.4 and the value for "house" is 0.2.

The media guidance application may determine (e.g., via control circuitry 304 (FIG. 3)) a distance based on the differences and values. For example, the media guidance application may find the Euclidean distance between the user profile and the second data structure based on the determined differences and values. For example, the media guidance application may determine the distance between the user profile and the second data structure to be $\sqrt{0.2^2+0.1^2+0.3^2+0.4^2+0.2^2}=0.583$. The media guidance application may determine (e.g., via control circuitry 304 (FIG. 3)) whether the distance is greater than a threshold distance. For example, the media guidance application may determine whether the distance is greater than a predefined threshold distance.

The media guidance application may, in response to determining that the distance is greater than the threshold distance, determine (e.g., via control circuitry 304 (FIG. 3)) that the user profile data and second data structure data are not similar. For example, the media guidance application may determine that the user profile data and second data structure data are not similar, in response to determining that the distance is greater than the predefined threshold distance.

The media guidance application may, in response to determining that the distance is not greater than the threshold distance, determine (e.g., via control circuitry 304 (FIG. 3)) that the user profile data and second data structure data are similar. For example, the media guidance application may determine that the user profile data and second data structure data are similar, in response to determining that the distance is less than or equal to the predefined threshold distance.

In some embodiments, the threshold time may be one of a fixed amount of time, and a time relative to a length of the second media asset. For example, the threshold time may be a fixed time (e.g., one minute). In another example, the threshold time may be a time relative to the length of the second video (e.g., 10% of the length of the second video). For example, if the second video is 30 minutes, the threshold time may be 10% of the 30 minutes, or 3 minutes.

In some embodiments, the media guidance application may determine that the media asset that the user viewed is of interest to the user and may tailor further recommendations to include media assets with similar keywords by adding the keywords that occur in the media asset to the user profile, or if the keywords are already in the user profile, increase the weights associated with the keywords. Specifically, the media guidance application may increase, in the user profile, the plurality of weights corresponding to keywords that occur in the content of the second media asset and add, to the user profile, keywords that occur in the content of the second media asset and are not in the user's profile by retrieving (e.g., from storage circuitry 308 (FIG. 3) and/or any location accessible via communications network 414 (FIG. 4)) a second data structure that includes a plurality of keywords that occur in the content of the second media asset and a plurality of weights that reflect a number of times each respective keyword of the plurality of keywords occurs in the content of the second media asset. This process is discussed in greater detail with respect to FIGS. 11 and 12. For example, the media guidance application may retrieve a second data structure, associated with the second video, including keywords that occur in the second video and weights that reflect the number of times each respective keyword occurs in the second video.

For example, in FIG. 5 display 540, the media guidance application may determine that the media asset, "NASA: Pluto," is of interest to the user and may wish to tailor further recommendations of media content to include media assets with similar keywords to those that occur in "NASA: Pluto." The user profile may, for example, include the following keywords: "Pluto," 1.0. The second data structure associated with the second media asset, "NASA: Pluto," may include the following keywords and corresponding weights: "Pluto," 0.5; "NASA," 0.3; and "space," 0.2.

The media guidance application may increase the weights, in the user profile, of keywords that occur in the second media asset by adding the second data structure to the user profile. Specifically, the media guidance application may add (e.g., via control circuitry 304 (FIG. 3)) a first weight of the plurality of weights in the second data structure, corresponding to a keyword, to a second weight of the plurality of weights in the user profile, corresponding to said keyword, for each keyword that is present in both the second data structure data and the user profile data. For example, the media guidance application may, for each keyword that is present in both the user profile and the second data structure, add the weight, corresponding to the keyword, in the second data structure to the weight, corresponding to the keyword, in the user profile. For example, the media guidance application may add 0.5, the weight corresponding to the keyword "Pluto" in the second data structure, to the weight corresponding to the keyword "Pluto" in the user profile. The user profile would then include the following keywords and corresponding weights: "Pluto," 1.5.

The media guidance application may add keywords that occur in the second media asset and are not already in the user profile to the user profile. Specifically, the media guidance application may add (e.g., via control circuitry 304 (FIG. 3)) a keyword of the plurality of keywords in the second data structure and a weight of the plurality of weights in the second data structure, corresponding to said keyword, to the user profile for each keyword that is present in the second data structure and is not present in the user profile. For example, the media guidance application may, for each keyword that is present in the second data structure and not present in the user profile, add the keyword and its corresponding weight in the second data structure to the user profile. For example, the media guidance application may add the keywords "NASA" and "space" and their corresponding weights from the second data structure to the user profile. The user profile would then include the following keywords: "Pluto," 1.5; "NASA," 0.3; "space," 0.2.

In some embodiments, the media guidance application may determine that the second media asset that the user viewed was not of interest to the user and may wish to tailor further recommendations of media content to exclude media assets with similar keywords. Accordingly, the media guidance application may decrease the plurality of weights in the user profile corresponding to keywords in the content of the second media asset and add keywords that occur in the content of the second media asset and are not in the user's profile by retrieving (e.g., from storage circuitry 308 (FIG. 3) and/or any location accessible via communications network 414 (FIG. 4)) a second data structure that includes a plurality of keywords that occur in the content of the second media asset and a plurality of weights that reflect a number of times each respective keyword of the plurality of keywords occurs in the content of the second media asset. For example, the media guidance application may retrieve a second data structure, associated with the second video, including keywords that occur in the second video and weights that reflect the number of times each respective keyword occurs in the second video. For example, in FIG. 5 display 540, the media guidance application may determine that the media asset "Pluto and Mickey" was not of interest to the user. The user profile may include the following keywords: "Pluto," 1.0. The second data structure associated with the second media asset may include the following keywords and corresponding weights: "Pluto," 0.5; "dog," 0.3; and "bone," 0.2.

The media guidance application may decrease the weights in the user profile corresponding to keywords that occur in the content of the second media asset by subtracting the weights in the second data structure from the weights in the user profile. Specifically, the media guidance application may subtract (e.g., via control circuitry 304 (FIG. 3)) a first weight of the plurality of weights in the second data structure, corresponding to a keyword, from a second weight of the plurality of weights in the user profile, corresponding to said keyword, for each keyword that is present in both the second data structure and the user profile. For example, the media guidance application may, for each keyword that is present in both the second data structure and the user profile data, subtract the weight corresponding to the keyword in the second data structure from the weight corresponding to the keyword in the user profile. For example, the media guidance application may subtract 0.5, the weight corresponding to the keyword "Pluto" in the second data structure, from the weight corresponding to the keyword "Pluto"

in the user profile. The user profile would then include the following keywords and corresponding weights: "Pluto," 0.5.

The media guidance application may store keywords that occur in the second media asset that are not present in the user profile. For example, after determining that the second media asset is not of interest to the user, the media guidance application may store keywords that occur in the content of the second media asset in the user profile to tailor further recommendations of media content to exclude media assets with those keywords. Specifically, the media guidance application may add (e.g., via control circuitry 304 (FIG. 3)) a keyword of the plurality of keywords in the second data structure and a negative of a weight of the plurality of weights in the second data structure, corresponding to said keyword, to the user profile for each keyword that is present in the second data structure and is not present in the user profile. For example, the media guidance application may, for each keyword that is present in the second data structure and not present in the user profile, add the keyword and the negative of its corresponding weight in the second data structure, to the user profile. For example, the media guidance application may add the keywords "dog" and "bone" and the negative of their corresponding weights from the second data structure to the user profile. The user profile would then include the following keywords: "Pluto," 0.5; "dog,"–0.3; "bone,"–0.2. The negative weights associated with some keywords in the user profile indicate the user's disinterest in media assets with those keywords.

In some embodiments, the media guidance application may reduce the number of keywords and their corresponding weights stored in the user profile. The media guidance application may determine (e.g., via control circuitry 304 (FIG. 3)) whether a weight of the plurality of weights in the user profile is less than or equal to zero. For example, the media guidance application may determine whether a weight corresponding to a keyword in the user profile is not greater than zero. For example, the media guidance application may determine that keywords "dog" and "bone" have corresponding weights in the user profile that are less than zero.

The media guidance application may, in response to determining that the weight of the plurality of weights in the user profile is less than or equal to zero, remove (e.g., via control circuitry 304 (FIG. 3)) the weight and its corresponding keyword from the user profile. For example, the media guidance application may, in response to determining that the weight corresponding to the keyword in the user profile is not greater than zero, remove the weight and its corresponding keyword from the user profile. For example, the media guidance application may remove "dog" and "bone" and their corresponding weights from the user profile. The user profile would then include the following keywords: "Pluto," 0.5.

In some embodiments, the second media asset may be a live video stream. For example, the second media asset may be a video being live-streamed from its source. For example, the second media asset may be a user-generated video or audio.

In some embodiments, the second media asset may be an excerpt of a live feed or the complete feed. For example, the second media asset may be a 30-second clip of a user-generated video, or the entire user-generated video. In some embodiments, the second media asset may be a compilation of excerpts from different media assets. For example, the second media asset may be a compilation of clips from different live feeds.

In some embodiments, the media guidance application may display the keywords in the user profile. For example, the media guidance application may display the keywords in the user profile to the user. The media guidance may receive a user input to remove a keyword from the user profile and may delete the keyword. For example, the media guidance application may receive the user selection of a keyword to delete from the user profile. The media guidance application may receive a user input to add a keyword to the user profile, and may add the keyword to the user profile. For example, the user may input a keyword to be added to the user profile, and the media guidance application may add the keyword to the user profile.

In some embodiments, the media guidance application may display a plurality of groups of keywords from the user profile to the user and the media assets that the groups of words occur in the content of. For example, the media guidance application may display the groups of keywords associated with the various videos the user has viewed. For example, the media guidance application may generate for display the group of words "Pluto," "space," "planet" next to the videos "Pluto" and "NASA: Pluto" and the group of words "Pluto," "dog," and "house" next to the video "Pluto and Mickey."

The media guidance application may receive a user selection of a group of words from the plurality of groups of words. For example, the user may select the group "Pluto," "space," "planet." The media guidance application may update the user profile to reflect the user selection. For example, the media guidance application may update the user profile to include only the keywords "Pluto," "space," and "planet." This provides the benefit of allowing users to select the keywords they are most interested in, making the media guidance application's recommendation more relevant and of interest to the users.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method.

Figure 7:
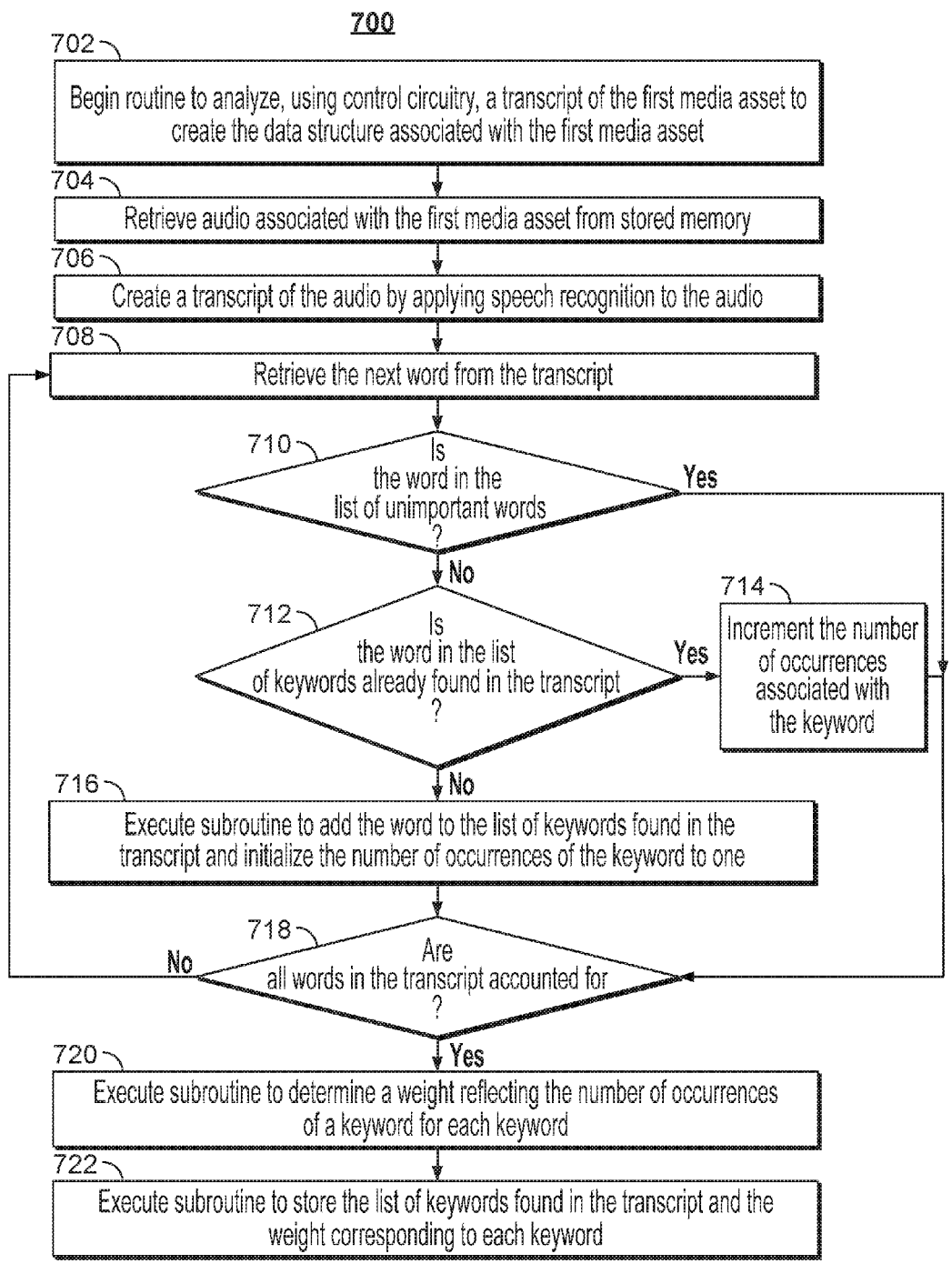
FIG. 7 is a flow-chart of illustrative steps for analyzing a transcript of a media asset in accordance with some embodiments of the disclosure.

FIGS. 7 and 8 present processes for control circuitry (e.g., control circuitry 304) to analyze a first media asset to determine a first plurality of keywords present in the first media asset and a number of times each keyword occurs in the first media asset in accordance with some embodiments of the disclosure. In some embodiments this algorithm may be encoded on to non-transitory storage medium (e.g., storage device 308) as a set of instructions to be decoded and executed by processing circuitry (e.g., processing circuitry 306). Processing circuitry may in turn provide instructions to other sub-circuits contained within control circuitry 304, such as the tuning, video generating, encoding, decoding, encrypting, decrypting, scaling, analog/digital conversion circuitry, and the like.

Flowchart 700 in FIG. 7 describes a process implemented on control circuitry (e.g., control circuitry 304) to analyze a transcript of the first media asset to create the data structure in accordance with some embodiments of the disclosure.

At step 702, control circuitry 304 will begin to analyze a first media asset. In some embodiments, this may be done either directly or indirectly in response to a user action or input (e.g., from signals received by control circuitry 304 or user input interface 310). For example, the process may begin directly in response to control circuitry 304 receiving signals from user input interface 310, or control circuitry 304 may prompt the user to confirm their input using a display (e.g., by generating a prompt to be displayed on display 312) prior to running the algorithm.

At step 704, control circuitry 304 proceeds to retrieve audio associated with the first media asset from stored memory. In some embodiments, control circuitry 304 retrieves the audio from storage 308. In some embodiments, control circuitry 304 retrieves the audio from media guidance data source 418. In some embodiments, control circuitry 304 retrieves the audio from media content source 416. In some embodiments, the audio is in a format such as WAV, MP3, MPEG-4, RAW, or any other audio format.

In some embodiments, control circuitry 304 retrieves closed captions/subtitles associated with the first media asset from stored memory. In some embodiments, control circuitry 304 may receive a single primitive data structure that represents the closed captions/subtitles. In some embodiments the value may be stored as part of a larger data structure, and control circuitry 304 may retrieve the value by executing appropriate accessor methods to retrieve the value from the larger data structure.

At step 706, control circuitry 304 proceeds to create a transcript of the audio associated with the media asset by applying speech recognition to the audio. For example, control circuitry 304 may use acoustic and language models to determine words in the audio waveform and may combine the words to create the transcript. In some embodiments, control circuitry 304 may implement a hidden Markov model as the statistical model representing the various sounds of the language to be recognized. For example, a narrator in a video may say, "Pluto is a dwarf planet in our solar system." Control circuitry may apply speech recognition to the audio to create a transcript of the sentence.

In some embodiments, control circuitry 304 creates a transcript of the closed captions/subtitles associated with the media asset.

At step 708, control circuitry 304 proceeds to retrieve the next word from the transcript. For example, control circuitry may retrieve the word "Pluto," the first word in the transcript. In some embodiments control circuitry 304 may receive a single primitive data structure that represents the value of the word. In some embodiments the value may be stored as part of a larger data structure, and control circuitry 304 may retrieve the value by executing appropriate accessor methods to retrieve the value from the larger data structure.

At step 710, control circuitry 304 proceeds to search a stored list of unimportant words for the value of the word to determine if the word is an unimportant word. If the condition is satisfied, the algorithm may proceed to step 718; if the condition is not satisfied, the algorithm may proceed to step 712 instead. For example, control circuitry may search a list of unimportant words such as "a," "an," "the," etc., to determine whether "Pluto" is an unimportant word. Since "Pluto" is not in the list of unimportant words, control circuitry may proceed to step 712. In another example, when processing the second word in the transcript, "is," control circuitry may find the word in the list of unimportant words and may proceed to step 718 instead. In some embodiments, the list of unimportant words may be stored (e.g., on storage device 308) prior to beginning the process. In some embodiments, the list of unimportant words may also be retrieved from media guidance data source 418. In some embodiments, control circuitry 304 may directly compare each value in the list of unimportant words with the value of the word by accessing the values respectively from memory and performing a value comparison. In some instances, control circuitry 304 may call a comparison function (e.g., for object-to-object comparison) to compare the word and the list of unimportant words.

At step 712, control circuitry 304 searches a list of keywords already found in the transcript for the value of the word to determine whether the word has been encountered in a previous iteration and added to the list of keywords already found in the transcript. For example, control circuitry may determine whether the word "Pluto" has already been processed in a previous iteration. For example, control circuitry 304 may add keywords found in the transcript to a list stored in storage 318 after they are processed. Control circuitry may iterate through the list of keywords, comparing each keyword with the current word being processed to determine whether the word has been encountered in a previous iteration and added to the list. In some embodiments, the list may be deleted after all words in the transcript are processed. If the word has already been encountered in a previous iteration and added to the list of keywords already found in the transcript, the algorithm may proceed to step 714; otherwise, the algorithm may proceed to step 716 instead. For example, on the first iteration the word "Pluto" is not in the list of words already found in the transcript because the list is empty, and control circuitry may proceed to step 716.

At step 714, control circuitry 304 increments the number of occurrences associated with the keyword based on the condition at step 712 being satisfied. After the subroutine is executed, the algorithm may proceed to step 718 where it is determined if all words in the transcript are accounted for and if further iterations are needed.

At step 716, control circuitry 304 executes a subroutine to add the word to the list of keywords found in the transcript and initialize the number of occurrences of the keyword to one based on both of the conditions in 710 and 712 not being satisfied. For example, control circuitry may add the word "Pluto" to the list of keywords found in the transcript and set the number of occurrences associated with the keyword "Pluto" to one. After the subroutine is executed, the algorithm may proceed to 718 where it is determined if all words in the transcript are accounted for and if further iterations are needed.

At step 718, control circuitry 304 checks if all words in the transcript are accounted for. If all of the instances have been evaluated, control circuitry 304 may proceed to step 720. For example, control circuitry 304 may call a function to see if there is a next word in the transcript. If the function returns true (i.e., there are still instances that need to be processed), control circuitry 304 may proceed to step 708. For example, control circuitry may determine that there are words to be processed after "Pluto" and may proceed to step 708 to retrieve and process the next word, "is." In another example, after control circuitry processes the last word in the transcript, "system," control circuitry may proceed to step 720 instead.

At step 720, control circuitry 304 executes a subroutine to determine a weight reflecting the number of times a keyword occurs in the transcript, for each keyword. For example, the list of keywords and their corresponding number of occurrences created from the transcript of "Pluto is a dwarf planet in our solar system" may include: "Pluto", 1; "dwarf," 1; "planet," 1; "solar," 1; and "system," 1. For example, the weights reflecting the number of times a keyword occurs in the transcript may be the number of times the keyword occurs divided by the total number of keywords in the transcript. For example, the weights reflecting the number of times a keyword occurs in the transcript of "Pluto is a dwarf planet in our solar system" may be: "Pluto", 0.2; "dwarf," 0.2; "planet," 0.2; "solar," 0.2; and "system," 0.2.

At step 722, control circuitry 304 executes a subroutine to store the list of keywords found in the transcript and the number of occurrences associated with each keyword.

It is contemplated that the descriptions of FIG. 7 may be used with any other embodiment of this disclosure. In addition, the descriptions described in relation to the algorithm of FIG. 7 may be done in alternative orders or in parallel to further the purposes of this disclosure. For example, conditional statements and logical evaluations, such as those at 708 and 712, may be performed in any order or in parallel or simultaneously to reduce lag or increase the speed of the system or method. As a further example, in some embodiments several words may be evaluated in parallel, using multiple logical processor threads, or the algorithm may be enhanced by incorporating branch prediction. Furthermore, it should be noted that the process of FIG. 7 may be implemented on a combination of appropriately configured software and hardware, and that any of the devices or equipment discussed in relation to FIGS. 3-4 could be used to implement one or more portions of the process. For example, all the steps of flowchart 700 may occur at a server (e.g., media guidance data source 418) or all the steps of flowchart 700 may occur at a user device (e.g., user television equipment 402, user computer equipment 404, wireless user communications device 406). In another example, some steps of flowchart 700 may occur at a server, while the remaining steps occur at a user device.

The pseudocode in FIG. 8 describes a process to analyze, using control circuitry, a first media asset to determine a first plurality of keywords present in the first media asset and a number of times each keyword occurs in the first media asset in accordance with some embodiments of the disclosure. It will be evident to one skilled in the art that the process described by the pseudocode in FIG. 8 may be implemented in any number of programming languages and a variety of different hardware, and that the style and format should not be construed as limiting, but rather a general template of the steps and procedures that would be consistent with code used to implement some embodiments of this disclosure.

At line 801, control circuitry 304 runs a subroutine to initialize variables and prepares to analyze a transcript of the first media asset to create the data structure associated with the first media asset, which begins on line 805. For example, in some embodiments control circuitry 304 may copy instructions from non-transitory storage medium (e.g., storage device 308) into RAM or into the cache for processing circuitry 306 during the initialization stage. Additionally, in some embodiments the value of the list of unimportant words being used for comparison may be retrieved, set, and stored at 801.

Line 803 includes a comment describing the purpose of the subroutine. In some embodiments, control circuitry 304 ignores the comment. In some embodiments, the comment is at the top of the code or on any other line in the code. In some embodiments, the comment is more specific by describing the purpose of specific variables and lines in the code. In some embodiments, the comment is missing entirely.

At line 805, control circuitry 304 retrieves audio associated with the first media asset from stored memory. In some embodiments, control circuitry 304 may receive a single primitive data structure that represents the audio. In some embodiments, the value may be stored as part of a larger data structure, and control circuitry 304 may retrieve the value by executing appropriate accessor methods to retrieve the value from the larger data structure.

In some embodiments, control circuitry 304 retrieves closed captions/subtitles associated with the first media asset from stored memory. In some embodiments, control circuitry 304 may receive a single primitive data structure that represents the closed captions/subtitles. In some embodiments, the value may be stored as part of a larger data structure, and control circuitry 304 may retrieve the value by executing appropriate accessor methods to retrieve the value from the larger data structure.

At line 806, control circuitry 304 proceeds to create a transcript of the audio by applying speech recognition to the audio. In some embodiments, the transcript may be retrieved from stored memory. Control circuitry 304 may receive words from the transcript by receiving, for example, a pointer to an array of values of words. In another example, control circuitry 304 may receive an object of a class, such as an iterator object containing the words in the transcript.

In some embodiments, control circuitry 304 creates a transcript from the closed captions/subtitles associated with the media asset.

At line 807, control circuitry 304 iterates through the various words in the transcript, if only a single instance is available, the loop will only execute once. This loop may be implemented in multiple fashions depending on the choice of hardware and software language used to implement the algorithm of FIG. 8; for example, this may be implemented as part of a "for" or "while" loop.

At line 808, control circuitry 304 stores the value of the word into a temporary variable "A." In some embodiments, the value of the word will be stored as part of a larger data structure or class, and the value of the word may be obtained through appropriate accessor methods. In some embodiments, the word may be converted from a string or other non-numeric data type into a numeric data type by means of an appropriate hashing algorithm. In some embodiments, control circuitry 304 may call a function to perform a search for the word in the list of unimportant words. In some embodiments, the word may be encoded as a primitive data structure, and rather than using a temporary variable, the word may be directly used in the comparisons at lines 810 and 811.

At line 809, control circuitry 304 stores the list of unimportant words into a temporary variable "B." Similar to the word, in some embodiments the value of each element in the list of unimportant words will be stored as part of a larger data structure or class, and the value of each element in the list of unimportant words may be obtained through accessor methods. In some embodiments, the list of unimportant words may be converted from a string or other non-numeric data type into a numeric data type by means of an appropriate hashing algorithm, or the list of unimportant words may be a primitive data structure, and may be directly used in the comparisons at line 810.

At line 810, control circuitry 304 searches the elements of B for the value of A to determine if the word is an unimportant word. This may be achieved by iterating the elements of B, and for each element subtracting the value of the element from A, taking the absolute value of the difference, and then comparing the absolute value of the difference to a predetermined tolerance level. In some embodiments the tolerance level may be a set percentage of either A or any of the elements of B. In some embodiments the tolerance level may be a fixed number. For example, setting the tolerance level to a set multiple of machine epsilon may allow for the algorithm to account for small rounding errors that may result from the use of floating point arithmetic. In some embodiments the tolerance level may be set to zero, or the condition inside the IF statement may be replaced with a strict equivalence between A and elements of B.

At line 811, control circuitry 304 searches the list of keywords already found in the transcript for the value of A to determine if the word has already been encountered in a previous iteration and added to the list of keywords found in the transcript. If the condition is satisfied, control circuitry 304 proceeds to line 812. If the condition is not satisfied, control circuitry 304 proceeds to line 814.

At line 812, control circuitry 304 increments the number of occurrences associated with the keyword using control circuitry if the condition in line 811 is satisfied.

At line 814, control circuitry 304 executes a subroutine to add the word to the list of keywords found in the transcript and initialize the number of occurrences of the keyword to one using control circuitry if conditions at lines 811 are not satisfied.

At line 816, control circuitry 304 executes a subroutine to determine a weight reflecting the number of occurrences of a keyword for each keyword.

At line 817, control circuitry 304 executes a subroutine to store, in memory, the list of keywords found in the transcript and the number of occurrences associated with each keyword using control.

At line 819, control circuitry 304 runs a termination subroutine after the algorithm has performed its function. For example, in some embodiments control circuitry 304 may destruct variables, perform garbage collection, free memory or clear the cache of processing circuitry 306.

It will be evident to one skilled in the art that process 800 described by the pseudocode in FIG. 8 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments break conditions may be placed after lines 810 and 812 to speed operation, or the conditional statements may be replaced with a case-switch. In some embodiments, rather than iterating over all words in the transcript in line 807, in some embodiments the code may be rewritten so control circuitry 304 is instructed to evaluate multiple words simultaneously on a plurality of processors or processor threads, lowering the number of iterations and potentially speeding up computation time.

Figure 9:
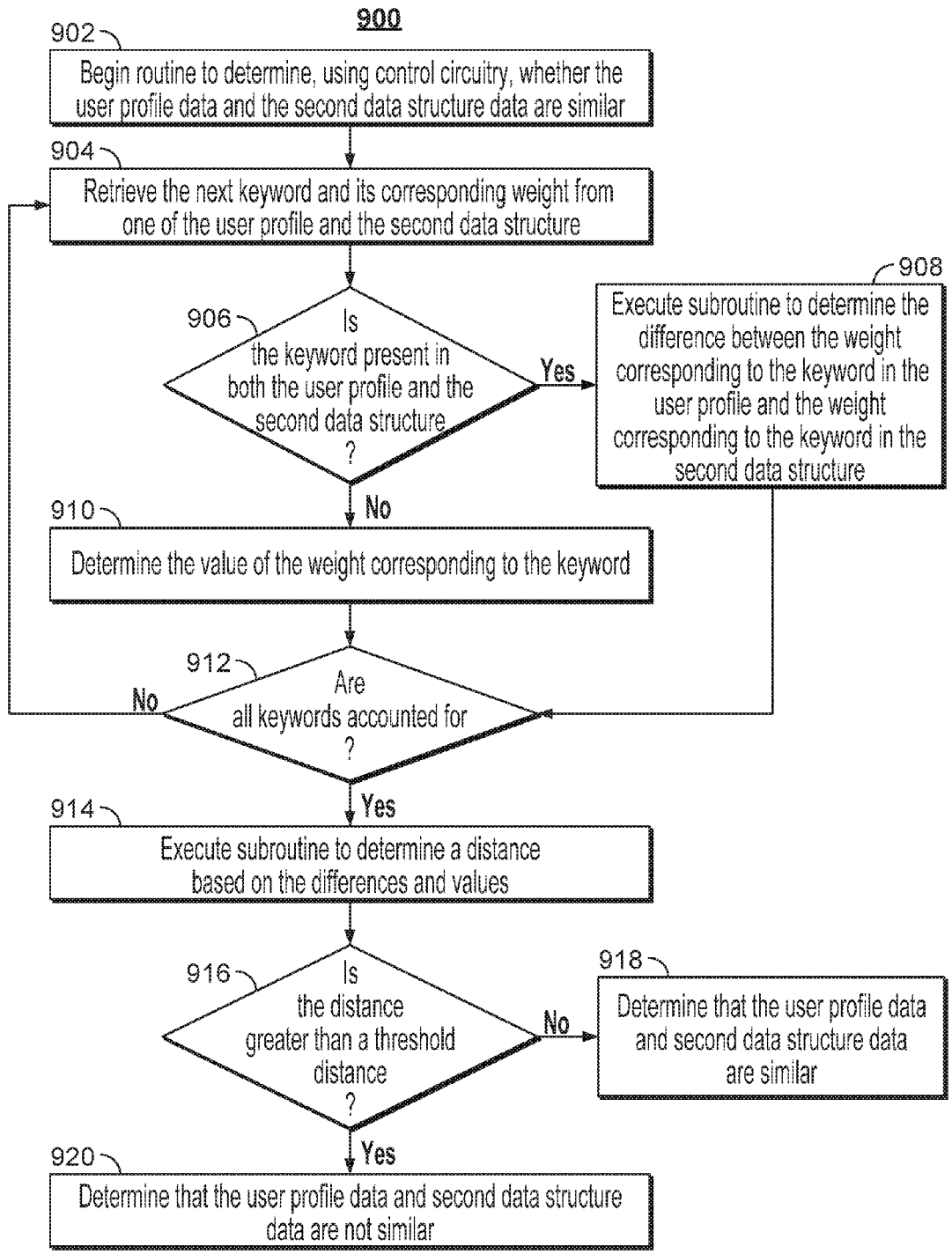
FIG. 9 is a flow-chart of illustrative steps for comparing data in a user profile data and data in a data structure associated with a media asset in accordance with some embodiments of the disclosure.

FIGS. 9 and 10 present processes implemented on control circuitry (e.g., control circuitry 304) to determine whether the user profile data and the second data structure data are similar in accordance with some embodiments of the disclosure. In some embodiments this process may be encoded on to non-transitory storage medium (e.g., storage device 308) as a set of instructions to be decoded and executed by processing circuitry (e.g., processing circuitry 306). Processing circuitry may in turn provide instructions to other sub-circuits contained within control circuitry 304, such as the tuning, video generating, encoding, decoding, encrypting, decrypting, scaling, analog/digital conversion circuitry, and the like.

Flowchart 900 in FIG. 9 describes a process implemented on control circuitry (e.g., control circuitry 304) to determine whether the user profile data and the second data structure data are similar in accordance with some embodiments of the disclosure.

At step 902, control circuitry 304 will begin to determine whether the user profile data and the second data structure data are similar. In some embodiments, this may be done either directly or indirectly in response to a user action or input (e.g., from signals received by control circuitry 304 or user input interface 310.)

At step 904, control circuitry 304 proceeds to retrieve the next keyword and its corresponding weight from stored memory. In some embodiments, control circuitry 304 creates a list of unique keywords by iterating through the keywords in both data structures and adding a keyword and its corresponding weight to the list if it is not already in the list. Control circuitry 304 may then use the list to retrieve the next keyword and its corresponding weight. For example, control circuitry 304 may store all of the keywords and their corresponding weights from the user profile in a list in storage 318. Control circuitry 304 may then iterate through the keywords in the second data structure, adding keywords that are not already in the list and their corresponding weights. In some embodiments control circuitry 304 may retrieve a single primitive data structure that represents the value of the keyword. In some embodiments control circuitry 304 may retrieve the value from a larger class or data structure.

At step 906, control circuitry 304 searches both the user profile and the second data structure for the keyword to determine if the keyword is present in both the user profile and the second data structure. In some embodiments, the user profile and data structure may be stored locally (e.g., on storage device 308) prior to beginning the algorithm. In some embodiments, the user profile and second data structure may also be accessed by using communications circuitry to transmit information across a communications network (e.g., communications network 414) to a database implemented on a remote storage device (e.g., media guidance data source 418). If control circuitry 304 determines that the keyword is in both the user profile and the second data structure, the algorithm proceeds to step 908; otherwise, the algorithm proceeds to step 910.

At step 908, control circuitry 304 executes subroutine to determine the difference in weights corresponding to the keyword in the user profile and second data structure. For example, control circuitry 304 determines the difference between the weight in the user profile corresponding to the keyword and the weight in the second data structure corresponding to the keyword. Afterwards, the algorithm may proceed to step 912 where it is determined if there are further keywords that need to be accounted for.

At step 910, control circuitry 304 determines the value of the weight corresponding to the keyword. Afterwards, the algorithm may proceed to step 912 where it is determined if there are further keywords that need to be accounted for.

At step 912, control circuitry 304 determines if all keywords are accounted for and if further iterations are needed. If further iterations are needed the algorithm will loop back to step 904 where control circuitry 304 will retrieve the next keyword. If no further iterations are needed the algorithm will proceed to step 914.

At step 914, control circuitry 304 executes subroutine to determine a distance based on the determined differences and values. In some embodiments, the distance may be determined by summing the absolute values of the differences and values. In some embodiment, the distance may be a Euclidean distance. For example, the distance may be the Euclidean distance between the point associated with the user profile and the point associated with the second data structure, wherein a point is defined by the weights corresponding to the keywords. Afterwards, the algorithm may proceed to step 916.

At step 916, control circuitry 304 determines if the distance is greater than a threshold distance. In some embodiments, the threshold distance may be stored locally (e.g., on storage device 308) prior to beginning the algorithm. In some embodiments, the threshold distance may also be accessed by using communications circuitry to transmit information across a communications network (e.g., communications network 414) to a database implemented on a remote storage device (e.g., media guidance data source 418). If control circuitry 304 determines that the distance is greater than the threshold distance, the algorithm proceeds to step 920; otherwise, the algorithm proceeds to step 918.

At step 918, control circuitry 304 determines that the user profile data and second data structure data are similar.

At step 920, control circuitry 304 determines that the user profile data and second data structure data are not similar.

It is contemplated that the descriptions of FIG. 9 may be used with any other embodiment of this disclosure. In addition, the descriptions described in relation to process 900 of FIG. 9 may be done in alternative orders or in parallel to further the purposes of this disclosure. For example, conditional statements and logical evaluations, such as those at 906 and 912, may be performed in any order or in parallel or simultaneously to reduce lag or increase the speed of the system or method. As a further example, in some embodiments several keywords may be evaluated in parallel, using multiple logical processor threads, or the algorithm may be enhanced by incorporating branch prediction. Furthermore, it should be noted that the process of FIG. 9 may be implemented on a combination of appropriately configured software and hardware, and that any of the devices or equipment discussed in relation to FIGS. 3-4 could be used to implement one or more portions of the process.

The pseudocode in FIG. 10 describes a process to determine whether the user profile data and the second data structure data are similar in accordance with some embodiments of the disclosure. It will be evident to one skilled in the art that process 1000 described by the pseudocode in FIG. 10 may be implemented in any number of programming languages and a variety of different hardware, and that the style and format should not be construed as limiting, but rather a general template of the steps and procedures that would be consistent with code used to implement some embodiments of this disclosure.

At line 1001, control circuitry 304 runs a subroutine, which begins on line 1005, to initialize variables and prepares to determine whether the user profile data and the second data structure data are similar. For example, in some embodiments control circuitry 304 may copy instructions from non-transitory storage medium (e.g., storage device 308) into RAM or into the cache for processing circuitry 306 during the initialization stage.

At line 1005, control circuitry 304 receives keywords and their corresponding weights. In some embodiments these instances may be retrieved from stored memory.

At line 1006, control circuitry 304 iterates through the various keywords; if only a single instance is available, the loop will only execute once. This loop may be implemented in multiple fashions depending on the choice of hardware and software language used to implement the algorithm of FIG. 10; for example, this may be implemented as part of a "for" or "while" loop, in some programming languages. In some embodiments it may be convenient to store the keywords in a single class or encapsulated data structure that will perform the loop as part of an internal method.

At line 1007, control circuitry 304 searches both the user profile and the second data structure for the keyword to determine if the keyword is present in both the user profile and the second data structure. If control circuitry 304 determines that the keyword is present in both the user profile and the second data structure, the algorithm may proceed to line 1008. If control circuitry 304 determines that the keyword is not present in both the user profile and the second data structure, the algorithm may instead proceed to line 1010.

At line 1008, control circuitry 304 executes a subroutine to determine the difference in weights corresponding to the keyword in the user profile and the second data structure. The algorithm may then proceed to line 1012.

At line 1010, control circuitry 304 determines the value of the weight corresponding to the keyword, if control circuitry 304 determines that the keyword is not present in both the user profile and the second data structure. Afterwards, the algorithm may proceed to line 1012.

At line 1012, control circuitry 304 executes a subroutine to determine a distance based on the determined differences and values, and the algorithm proceeds to line 1013.

At line 1013, control circuitry 304 determines if the distance is greater than a threshold distance. If control circuitry 304 determines that the distance is greater than a threshold distance, the algorithm may proceed to line 1014. If control circuitry 304 determines that the distance is not greater than a threshold distance, the algorithm may proceed to line 1016.

At line 1014, control circuitry 304 determines that the user profile data and second data structure data are not similar. Afterwards, the algorithm will proceed to line 1018.

At line 1016, control circuitry 304 determines that the user profile data and second data structure data are similar. Afterwards, the algorithm will proceed to line 1018.

At line 1018, control circuitry 304 executes a termination subroutine after the algorithm has performed its function and all keywords have been processed. For example, in some embodiments control circuitry 304 may destruct variables, perform garbage collection, free memory or clear the cache of processing circuitry 306.

It will be evident to one skilled in the art that process 1000 described by the pseudocode in FIG. 10 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments the code may be rewritten so control circuitry 304 is instructed to evaluate multiple keywords simultaneously using a plurality of processors or processor threads. In some embodiments, rather than iterating over all keywords in line 1006, in some embodiments the code may be rewritten so control circuitry 304 is instructed to evaluate multiple words simultaneously on a plurality of processors or processor threads, lowering the number of iterations needed and potentially speeding up computation time.

Figure 11:
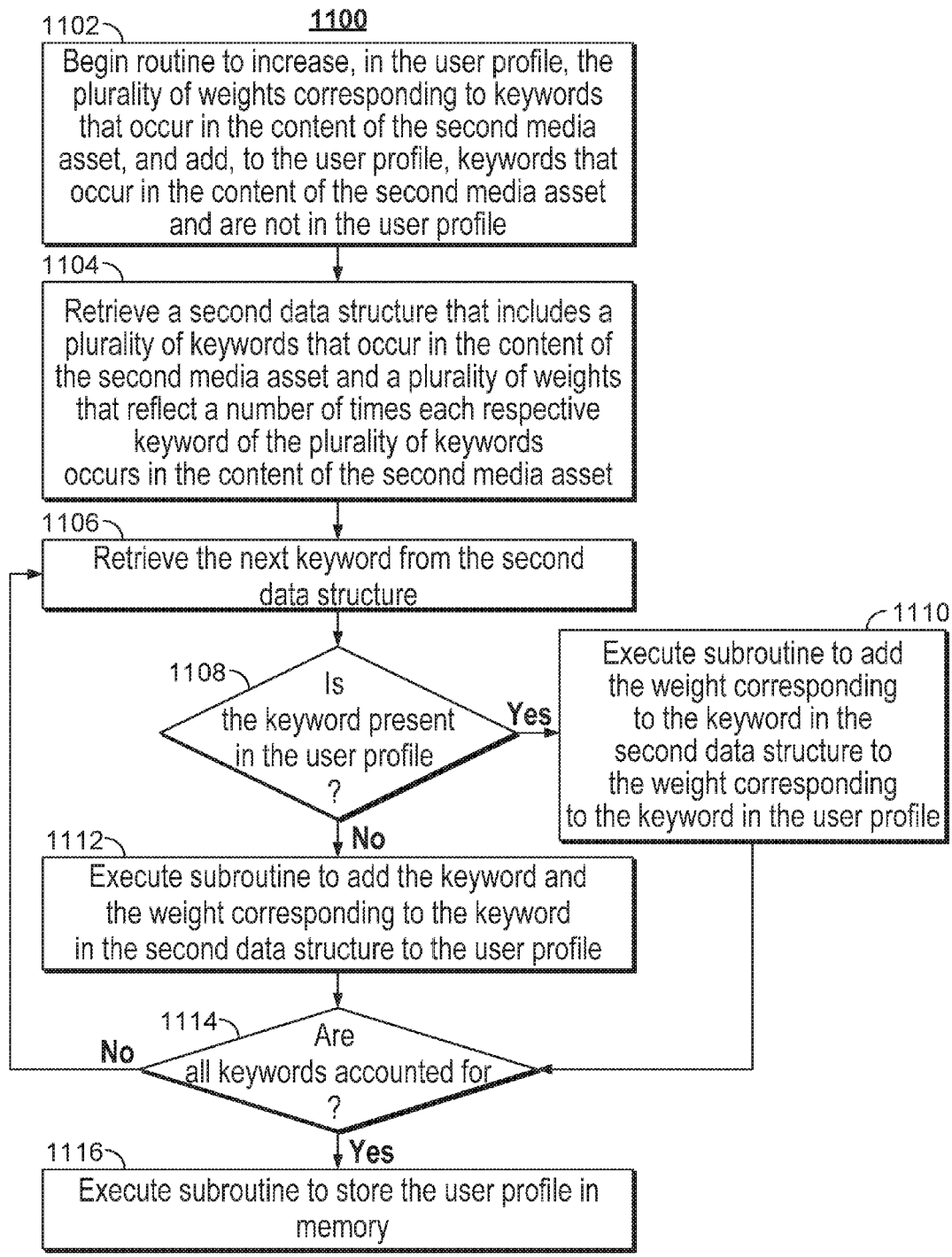
FIG. 11 is a flow-chart of illustrative steps for increasing, in the user profile, a plurality of weights corresponding to keywords that occur in a content of a media asset and adding, to the user profile, keywords that occur in the content of the media asset and are not in the user profile in accordance with some embodiments of the disclosure.

FIGS. 11 and 12 present processes implemented on control circuitry (e.g., control circuitry 304) to increase, in the user profile, the plurality of weights corresponding to keywords that occur in the content of the second media asset and add, to the user profile, keywords that occur in the content of the second media asset and are not in the user profile in accordance with some embodiments of the disclosure. Similar to the algorithms described by FIGS. 7 and 8, in some embodiments this process may be encoded on to non-transitory storage medium (e.g., storage device 308) as a set of instructions to be decoded and executed by processing circuitry (e.g., processing circuitry 306). Processing circuitry may in turn provide instructions to other sub-circuits contained within control circuitry 304, such as the tuning, video generating, encoding, decoding, encrypting, decrypting, scaling, analog/digital conversion circuitry, and the like.

Flowchart 1100 in FIG. 11 describes a process implemented on control circuitry (e.g., control circuitry 304) to increase the plurality of weights in the user profile, corresponding to keywords that occur in the content of the second media asset, and add keywords that occur in the content of the second media asset and are not in the user profile in accordance with some embodiments of the disclosure.

At step 1102, control circuitry 304 will begin to increase the plurality of weights in the user profile, corresponding to keywords that occur in the content of the second media asset, and add keywords that occur in the content of the second media asset and are not in the user profile. In some embodiments, this may be done in response to control circuitry 304 determining that the user profile data and second data structure data, associated with the second media asset, are similar.

At step 1104, control circuitry 304 proceeds to retrieve a second data structure that includes a plurality of keywords that occur in the content of the second media asset and a plurality of weights that reflect a number of times each respective keyword of the plurality of keywords occurs in the content of the second media asset. In some embodiments, the second data structure may be stored locally on the user device (e.g., on storage device 308) prior to beginning the algorithm. In some embodiments, the second data structure may also be accessed by using communications circuitry to transmit information across a communications network (e.g., communications network 414) to a database implemented on a remote storage device (e.g., media guidance data source 418).

At step 1106, control circuitry 304 proceeds to retrieve the next keyword from stored memory. In some embodiments, control circuitry may store the keywords of the second data structure in a list in storage and may iterate through the list to get the next keyword. In some embodiments, control circuitry 304 may retrieve a single primitive data structure that represents the value of the keyword. In some embodiments, control circuitry 304 may retrieve the value from a larger class or data structure.

At step 1108, control circuitry 304 searches the user profile for the keyword to determine if the keyword is present in user profile. In some embodiments, the user profile may be stored locally (e.g., on storage device 308) prior to beginning the algorithm. In some embodiments, the user profile may also be accessed by using communications circuitry to transmit information across a communications network (e.g., communications network 414) to a database implemented on a remote storage device (e.g., media guidance data source 418). If control circuitry 304 determines that the keyword is in the user profile, the algorithm proceeds to step 1110; otherwise, the algorithm proceeds to step 1112.

At step 1110, control circuitry 304 executes a subroutine to add the weight corresponding to the keyword in the second data structure to the weight corresponding to the keyword in the user profile. After determining that the keyword is present in the user profile, control circuitry 304 adds the weight from the second data structure to the weight in the user profile corresponding to the keyword. Afterwards, the algorithm may proceed to step 1114 where it is determined if there are further keywords that need to be accounted for.

In contrast, at step 1112, control circuitry 304 executes a subroutine to add the keyword and the weight corresponding to the keyword in the second data structure to the user profile. After determining that the keyword is not present in the user profile, control circuitry 304 adds the keyword to the user profile. In addition, control circuitry initializes the weight in the user profile corresponding to the keyword to the weight corresponding to the keyword in the second data structure. Afterwards, the algorithm may proceed to step 1114 where it is determined if there are further keywords that need to be accounted for.

At step 1114, control circuitry 304 determines if all keywords are accounted for and if further iterations are needed. If further iterations are needed, the algorithm will loop back to step 1104 where control circuitry 304 will retrieve the next keyword. If no further iterations are needed, the algorithm will proceed to step 1116.

At step 1116, control circuitry 304 executes a subroutine to store the user profile in memory (e.g., on storage device 308).

It is contemplated that the descriptions of FIG. 11 may be used with any other embodiment of this disclosure. In addition, the descriptions described in relation to process 1100 of FIG. 11 may be done in alternative orders or in parallel to further the purposes of this disclosure. For example, control circuitry 304 may process multiple keywords in parallel. Furthermore, it should be noted that the process of FIG. 11 may be implemented on a combination of appropriately configured software and hardware, and that any of the devices or equipment discussed in relation to FIGS. 3-4 could be used to implement one or more portions of the algorithm.

The pseudocode in FIG. 12 describes a process to increase the plurality of weights in the user profile, corresponding to keywords that occur in the content of the second media asset, and to add keywords that occur in the content of the second media asset and are not in the user profile. It will be evident to one skilled in the art that process 1200 described by the pseudocode in FIG. 12 may be implemented in any number of programming languages and a variety of different hardware, and that the style and format should not be construed as limiting, but rather a general template of the steps and procedures that would be consistent with code used to implement some embodiments of this disclosure.

At line 1201, control circuitry 304 runs a subroutine to initialize variables and prepares to increase the plurality of weights in the user profile, corresponding to keywords that occur in the content of the second media asset, and to add keywords that occur in the content of the second media asset and are not in the user profile, which begins on line 1205. For example, in some embodiments control circuitry 304 may copy instructions from non-transitory storage medium (e.g., storage device 308) into RAM or into the cache for processing circuitry 306 during the initialization stage.

At line 1205, control circuitry 304 retrieves a second data structure that includes a plurality of keywords that occur in the content of the second media asset and a plurality of weights that reflect a number of times each respective keyword of the plurality of keywords occurs in the content of the second media asset. In some embodiments, the second data structure instances may be retrieved from stored memory. In some embodiments, the second data structure may be retrieved from a database on a remote storage device (e.g., media guidance data source 418) by using communications circuitry to transmit information across a communications network (e.g., communications network 414).

At line 1206, control circuitry 304 iterates through the various keywords; if only a single instance is available, the loop will only execute once. This loop may be implemented in multiple fashions depending on the choice of hardware and software language used to implement the algorithm of FIG. 12; for example, this may be implemented as part of a "for" or "while" loop, in some programming languages. In some embodiments, it may be convenient to store the keywords in a single class or encapsulated data structure that will perform the loop as part of an internal method.

At line 1207, control circuitry 304 searches the user profile for the keyword to determine if the keyword is present in the user profile. If control circuitry 304 determines that the keyword is present in the user profile, the algorithm may proceed to line 1208. If control circuitry 304 determines that the keyword is not present in both data structures, the algorithm may instead proceed to line 1210.

At line 1208, control circuitry 304 executes a subroutine to add the weight corresponding to the keyword in the second data structure to the weight corresponding to the keyword in the user profile. The algorithm may then proceed to line 1212.

At line 1210, control circuitry 304 executes a subroutine to add the keyword and the weight corresponding to the keyword in the second data structure to the user profile, if control circuitry 304 determines that the keyword is not present in the user profile. Afterwards, the algorithm may proceed to line 1212.

At line 1212, control circuitry 304 executes a subroutine to store the user profile in memory; then the algorithm proceeds to line 1214.

At line 1214, control circuitry 304 executes a termination subroutine after the algorithm has performed its function and all keywords have been processed. For example, in some embodiments control circuitry 304 may destruct variables, perform garbage collection, free memory or clear the cache of processing circuitry 306.

It will be evident to one skilled in the art that process 1200 described by the pseudocode in FIG. 12 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments the code may be re-written so control circuitry 304 is instructed to evaluate multiple keywords simultaneously using a plurality of processors or processor threads. It is also understood that although we may describe control circuitry 304 interacting with a single database, this is only a single embodiment described for illustrative purposes, and the algorithm of FIG. 12 may be implemented using multiple independent or cross-referenced databases. For example, a database stored locally (e.g., on storage 308) may index or cross-reference a database stored remotely (e.g., media guidance data source 418), which may be accessible through any number of communication channels (e.g., communications network 414). In some embodiments, this may allow control circuitry 304 to utilize a look-up table or database front-end efficiently stored on a small local drive to access a larger database stored on a remote server on demand.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for recommending media assets, the method comprising:

receiving, from a user input device, a first user selection of a first media asset, wherein the first media asset is associated with a data structure that includes a plurality of keywords that occur in a content of the first media asset and a plurality of weights that reflect a number of times each respective keyword of the plurality of keywords occurs in the content of the first media asset;

in response to receiving the first user selection of the first media asset:

generating, using control circuitry, for display the first media asset; and modifying a user profile associated with the user, based on the plurality of keywords and the plurality of weights associated with the first media asset;

generating, using the control circuitry, for display a recommendation of a second media asset to the user based on the user profile;

receiving, from the user input device, a second user selection of the second media asset, by the user;

in response to receiving the second user selection of the second media asset, generating, using the control circuitry, for display the second media asset;

after a period of time, receiving, from the user input device, a third user selection to change the display of the second media asset to a display of a third media asset;

determining, using the control circuitry, whether the period of time is greater than a threshold time;

in response to determining that the period of time is greater than the threshold time, modifying, using control circuitry, the user profile by increasing a plurality of weights in the user profile corresponding to keywords that occur in a content of the second media asset and adding keywords that occur in the content of the second media asset and are not in the user profile; and in response to determining that the period of time is not greater than the threshold time, modifying, using control circuitry, the user profile by decreasing the plurality of weights in the user profile corresponding to keywords in the content of the second media asset and adding keywords that occur in the content of the second media asset and are not in the user profile.

2. The method of claim 1, wherein keywords are words that occur in a media asset.

3. The method of claim 1, wherein the data structure is created by analyzing a transcript of the first media asset for keywords, wherein the transcript is one of text created by applying speech recognition to audio associated with the first media asset and closed captions associated with the first media asset.

4. The method of claim 1, wherein weight corresponds to a frequency at which the keyword corresponding to the weight occurs, wherein the frequency is an average number of times the keyword occurs per a unit time.

5. The method of claim 1, wherein generating for display the recommendation of the second media asset to the user based on the user profile comprises:
   retrieving a second data structure that includes a plurality of keywords that occur in the content of the second media asset and a plurality of weights that reflect a number of times each respective keyword of the plurality of keywords occurs in the content of the second media asset;
   determining, using control circuitry, whether the user profile data and the second data structure data are similar; and
   in response to determining that the user profile and the second data structure are similar, generating for display, using control circuitry, a recommendation of the second media asset to the user.

6. The method of claim 5, wherein determining whether the user profile data and the second data structure data are similar comprises:
   determining a difference between a first weight of the plurality of weights in the user profile, corresponding to a first keyword, and a second weight of the plurality of weights in the second data structure, corresponding to the first keyword, for each keyword that is present in both the user profile and the second data structure;
   determining a value of a third weight of the plurality of weights in the user profile or in the second data structure, corresponding to a third keyword, for each keyword that is present in one of the 1 user profile and the second data structure and not present in both the user profile and the second data structure;
   determining a distance based on the differences and values;
   determining whether the distance is greater than a threshold distance;
   in response to determining that the distance is greater than the threshold distance, determining that the user profile data and the second data structure data are not similar; and
   in response to determining that the distance is not greater than the threshold distance, determining that the user profile data and the second data structure data are similar.

7. The method of claim 1, wherein the threshold time is one of a fixed amount of time, and a time relative to a length of the second media asset.

8. The method of claim 1, wherein increasing the plurality of weights in the user profile corresponding to the keywords that occur in the content of the second media asset and adding the keywords that occur in the content of the second media asset and are not in the users profile comprises:
   retrieving a second data structure that includes a second plurality of keywords that occur in the content of the second media asset and a second plurality of weights that reflect a number of times each respective keyword of the second plurality of keywords occurs in the content of the second media asset;
   adding a first weight of the second plurality of weights in the second data structure, corresponding to a first keyword, to a second weight of the plurality of weights in the user profile, corresponding to the first keyword, for each keyword that occurs in both the second data structure and the user profile; and
   adding a second keyword of the second plurality of keywords in the second data structure and a third weight of the second plurality of weights in the second data structure, corresponding to the second keyword, to the user profile for each keyword that is present in the second data structure and is not present in the user profile.

9. The method of claim 1, wherein decreasing the plurality of weights in the user profile corresponding to the keywords in the content of the second media asset and adding the keywords that occur in the content of the second media asset and are not in the user profile comprises:
   retrieving a second data structure that includes a plurality of keywords that occur in the content of the second media asset and a plurality of weights that reflect a number of times each respective keyword of the plurality of keywords occurs in the content of the second media asset; and
   subtracting a first weight of the plurality of weights in the second data structure, corresponding to a keyword, from a second weight of the plurality of weights in the user profile, corresponding to said keyword, for each keyword that is present in both the second data structure and the user profile; and
   adding a keyword of the plurality of keywords in the second data structure and a negative of a weight of the plurality of weights in the second data structure, corresponding to said keyword, to the user profile for each keyword that is present in the second data structure and is not present in the user profile.

10. The method of claim 1, wherein the second media asset is a live video stream.

11. A system for recommending media assets, the system comprising a memory coupled to control circuitry, wherein the control circuitry is configured to:
   receive, from a user input device, a first user selection of a first media asset, wherein the first media asset is associated with a data structure that includes a plurality of keywords that occur in a content of the first media asset and a plurality of weights that reflect a number of times each respective keyword of the plurality of keywords occurs in the content of the first media asset;
   in response to receiving the first user selection of the first media asset:
      generate, using control circuitry, for display the first media asset; and
      modify a user profile associated with the user, based on the plurality of keywords and the plurality of weights associated with the first media asset;
   generate, using the control circuitry, for display a recommendation of a second media asset to the user based on the user profile;
   receive, from the user input device, a second user selection of the second media asset, by the user;
   in response to receiving the second user selection of the second media asset, generate, using the control circuitry, for display the second media asset;

after a period of time, receive, from the user input device, a third user selection to change the display of the second media asset to a display of a third media asset;

determine, using the control circuitry, whether the period of time is greater than a threshold time;

in response to determining that the period of time is greater than the threshold time, modify, using control circuitry, the user profile by increasing a plurality of weights in the user profile corresponding to keywords that occur in a content of the second media asset and adding keywords that occur in the content of the second media asset and are not in the user profile; and in response to determining that the period of time is not greater than the threshold time, modify, using control circuitry, the user profile by decreasing the plurality of weights in the user profile corresponding to keywords in the content of the second media asset and adding keywords that occur in the content of the second media asset and are not in the user profile.

12. The system of claim 11, wherein keywords are words that occur in a media asset.

13. The system of claim 11, wherein the data structure associated with the first media asset is created by analyzing a transcript of the first media asset for keywords, wherein the transcript is one of text created by applying speech recognition to audio associated with the first media asset and closed captions associated with the first media asset.

14. The system of claim 11, wherein weight corresponds to a frequency at which the keyword corresponding to the weight occurs, wherein the frequency is an average number of times the keyword occurs per a unit time.

15. The system of claim 11, wherein control circuitry is further configured, when generating for display a recommendation of a second media asset to the user based on the user profile, to:

retrieve a second data structure that includes a plurality of keywords that occur in the content of the second media asset and a plurality of weights that reflect a number of times each respective keyword of the plurality of keywords occurs in the content of the second media asset;

determine, using control circuitry, whether the user profile data and the second data structure data are similar; and in response to determining that the user 1 profile and the second data structure are similar, generate for display, using control circuitry, a recommendation of the second media asset to the user.

16. The system of claim 15, wherein control circuitry is further configured, when determining whether the user profile data and the second data structure data are similar, to:

determine a difference between a first weight of the plurality of weights in the user profile, corresponding to a first keyword, and a second weight of the plurality of weights in the second data structure, corresponding to the first keyword, for each keyword that is present in both the user profile and the second data structure;

determine a value of a third weight of the plurality of weights in the user profile or in the second data structure, corresponding to a second keyword, for each keyword that is present in one of the user profile and the second data structure and not present in both the user profile and the second data structure;

determine a distance based on the differences and values;

determine whether the distance is greater than a threshold distance;

in response to determining that the distance is greater than the threshold distance, determine that the user profile data and the second data structure data are not similar;

and in response to determining that the distance is not greater than the threshold distance, determine that the user profile data and the second data structure data are similar.

17. The system of claim 11, wherein the threshold time is one of a fixed amount of time, and a time relative to a length of the second media asset.

18. The system of claim 11, wherein control circuitry is further configured, when increasing the plurality of weights in the user profile corresponding to keywords that occur in the content of the second media asset and adding keywords that occur in the content of the second media asset and are not in the users profile, to:

retrieve a second data structure that includes a second plurality of keywords that occur in the content of the second media asset and a second plurality of weights that reflect a number of times each respective keyword of the second plurality of keywords occurs in the content of the second media asset;

add a first weight of the second plurality of weights in the second data structure, corresponding to a first keyword, to a second weight of the plurality of weights in the user profile, corresponding to the first keyword, for each keyword that occurs in both the second data structure and the user profile; and add a second keyword of the second plurality of keywords in the second data structure and a third weight of the second plurality of weights in the second data structure, corresponding to the second keyword, to the user profile for each keyword that is present in the second data structure and is not present in the user profile.

19. The system of claim 11, wherein control circuitry is further configured, when decreasing the plurality of weights in the user profile corresponding to the keywords in the content of the second media asset and adding the keywords that occur in the content of the second media asset and are not in the user profile, to:

retrieve a second data structure that includes a plurality of keywords that occur in the content of the second media asset and a plurality of weights that reflect a number of times each respective keyword of the plurality of keywords occurs in the content of the second media asset; and subtract a first weight of the plurality of weights in the second data structure, corresponding to a keyword, from a second weight of the plurality of weights in the user profile, corresponding to said keyword, for each keyword that is present in both the second data structure and the user profile; and add a keyword of the plurality of keywords in the second data structure and a negative of a weight of the plurality of weights in the second data structure, corresponding to said keyword, to the user profile for each keyword that is present in the second data structure and is not present in the user profile.

20. The system of claim 11, wherein the second media asset is a live video stream.

* * * * *